(12) United States Patent
Tateno et al.

(10) Patent No.: US 12,413,831 B2
(45) Date of Patent: Sep. 9, 2025

(54) INFORMATION PROCESSING APPARATUS, INFORMATION PROCESSING METHOD, AND INFORMATION PROCESSING PROGRAM

(71) Applicant: Sony Group Corporation, Tokyo (JP)

(72) Inventors: Kei Tateno, Tokyo (JP); Masahiro Yoshida, Tokyo (JP); Takuma Udagawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 241 days.

(21) Appl. No.: 18/251,715

(22) PCT Filed: Aug. 10, 2021

(86) PCT No.: PCT/JP2021/029539
§ 371 (c)(1),
(2) Date: May 4, 2023

(87) PCT Pub. No.: WO2022/102186
PCT Pub. Date: May 19, 2022

(65) Prior Publication Data
US 2024/0015370 A1 Jan. 11, 2024

(30) Foreign Application Priority Data

Nov. 13, 2020 (JP) .................................. 2020-189242
Feb. 26, 2021 (JP) .................................. 2021-030091

(51) Int. Cl.
*H04N 21/854* (2011.01)
*H04N 21/81* (2011.01)

(52) U.S. Cl.
CPC ....... *H04N 21/854* (2013.01); *H04N 21/8126* (2013.01)

(58) Field of Classification Search
CPC ............ H04N 21/854; H04N 21/8126; H04N 21/42201; H04N 21/44218;
(Continued)

(56) References Cited

U.S. PATENT DOCUMENTS

2002/0053078 A1* 5/2002 Holtz ................. H04N 21/4782
348/E5.022
2011/0225153 A1 9/2011 Haseyama
(Continued)

FOREIGN PATENT DOCUMENTS

JP 2012-039550 A 2/2012
WO 2010/053160 A1 5/2010
(Continued)

OTHER PUBLICATIONS

International Search Report and Written Opinion mailed on Nov. 9, 2021, received for PCT Application PCT/JP2021/029539, filed on Aug. 10, 2021, 9 pages including English Translation.

*Primary Examiner* — Oschta I Montoya
(74) *Attorney, Agent, or Firm* — XSENSUS LLP

(57) ABSTRACT

An information processing apparatus, an information processing method, and an information processing program that can present appropriate content that can be used as a reference for content creation to content creators. The information processing apparatus includes a content generating unit configured to generate new content on the basis of input information and status information indicating a status of a consumer when the consumer has consumed content, and to-be-presented content determining unit configured to determine any one of or both of the new content and existing content as to-be-presented content that is presented to a creator of the content.

9 Claims, 19 Drawing Sheets

(58) Field of Classification Search
CPC ......... H04N 21/44222; H04N 21/4662; H04N 21/4668; G06N 3/0442; G06N 3/0455; G06N 3/047; G06N 3/0475; G06N 3/094; G06Q 10/101; G06Q 30/0251; G06Q 30/0276; G06Q 30/0282; G06Q 30/0201; G06Q 50/10
See application file for complete search history.

(56) References Cited

U.S. PATENT DOCUMENTS

| | | |
|---|---|---|
| 2016/0266740 A1 | 9/2016 | Glasgow |
| 2020/0166996 A1* | 5/2020 | Seo .................. G06V 20/41 |
| 2020/0273485 A1 | 8/2020 | Jagmag |
| 2021/0044848 A1* | 2/2021 | Liu ................... H04N 21/2402 |
| 2021/0406271 A1* | 12/2021 | Meling ............... G06F 16/3344 |

FOREIGN PATENT DOCUMENTS

| | | |
|---|---|---|
| WO | 2017/051793 A1 | 3/2017 |
| WO | 2020/039702 A1 | 2/2020 |
| WO | 2020/136959 A1 | 7/2020 |

* cited by examiner

FIG.3

| USER ID | CONTENT ID | DATE AND TIME | STATUS |
|---|---|---|---|
| 1001 | A2001 | 2020/04/01 12:00:00 JST | COMPLETE WATCHING |
| 1002 | A2001 | 2020/04/01 12:01:00 JST | INPUT "GOOD" |
| 1002 | D2003 | 2020/04/02 13:05:00 JST | SMILE |
| 1003 | D2003 | 2020/04/02 13:30:00 JST | STOP CONTENT |
| ⋮ | ⋮ | ⋮ | ⋮ |

FIG.6
A
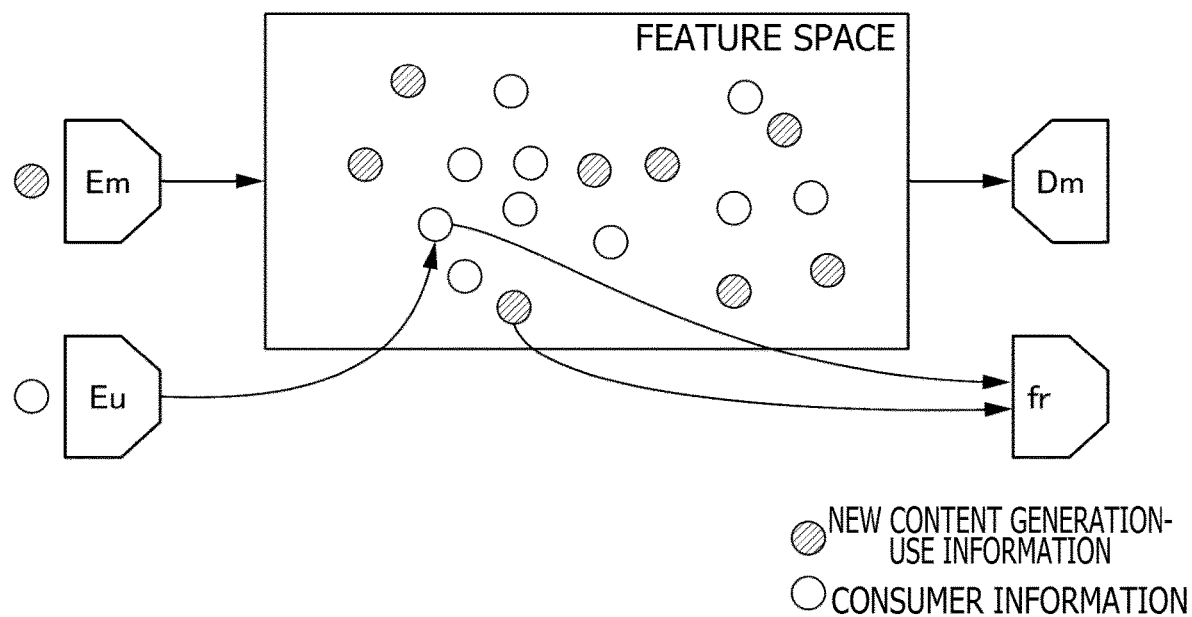
B
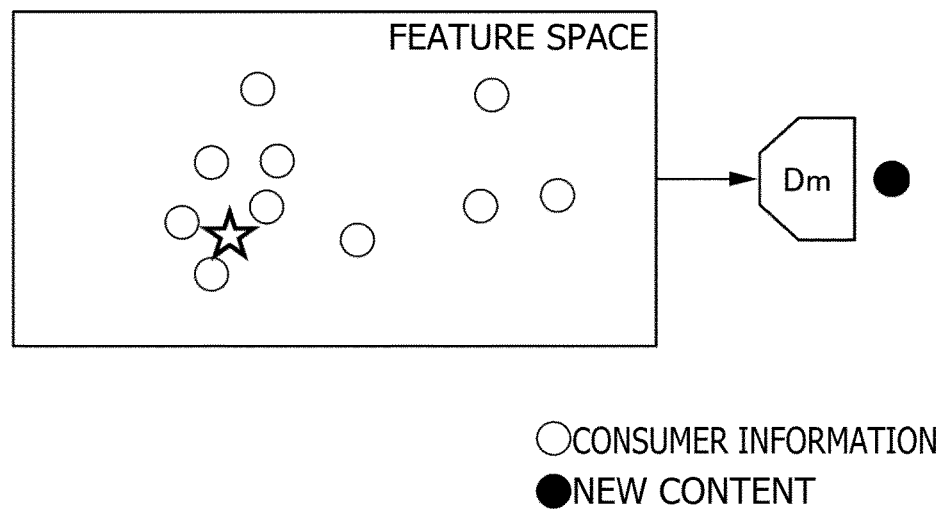

FIG. 7
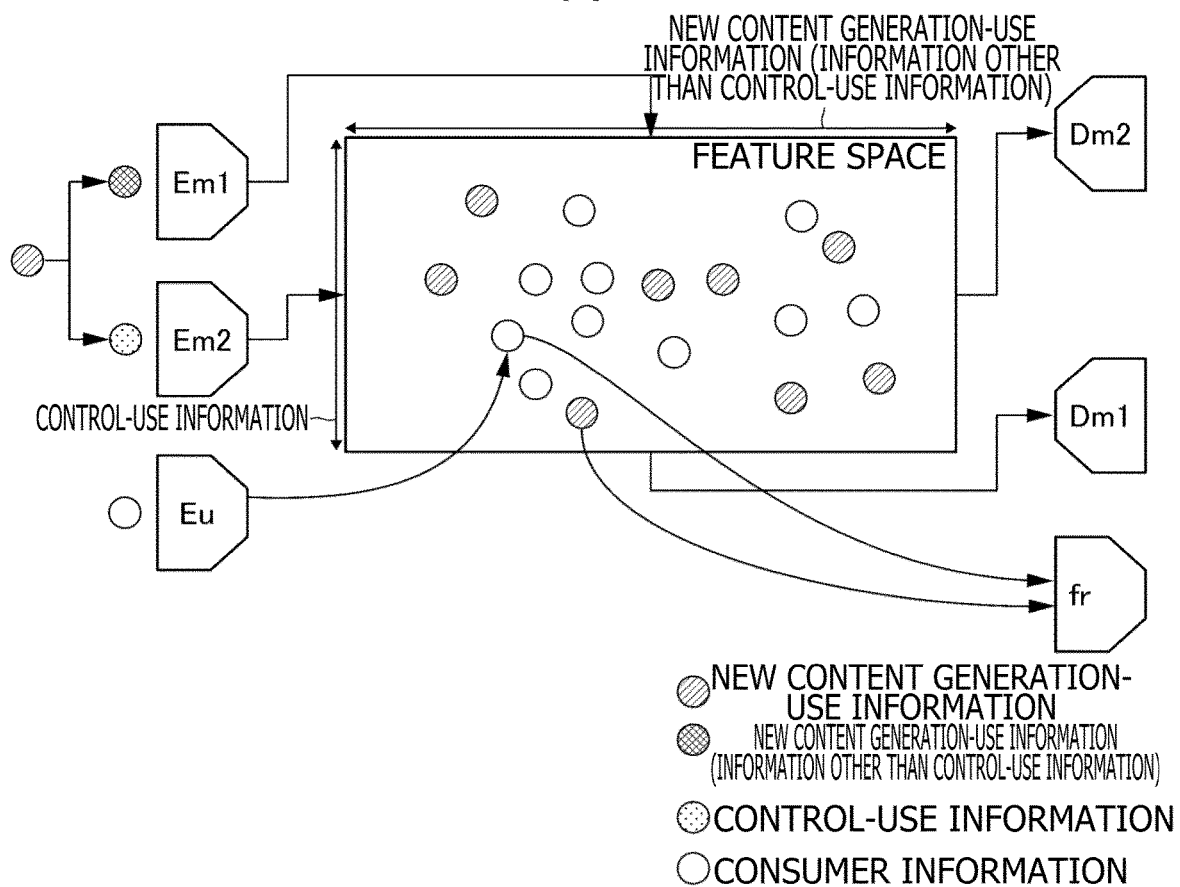
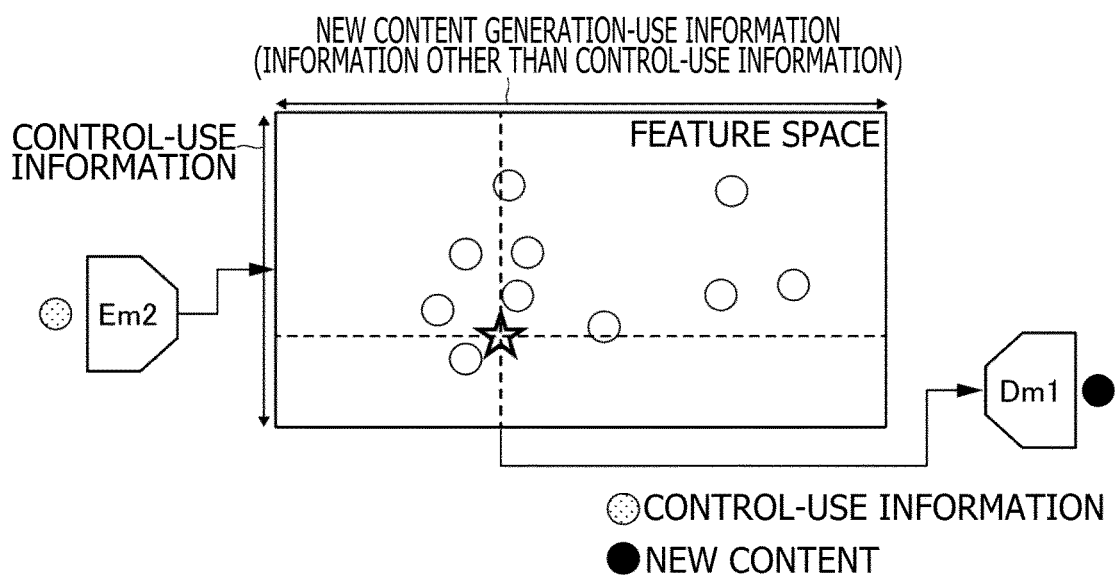

FIG.9

1 SELECT CONTENT FOR REFERENCE

| INPUTTABLE CONTENT LIST | SELECT ALL |
|---|---|

☐ STAYBLUE
AUTHOR: RYOKO NAKAMURA
PUBLISHER: Somy PUBLISHING CORPORATION
RELEASE DATE: 2020/02/25

☐ WITH ROBOT THAT IS MY PET
AUTHOR: HIDEO SATO
PUBLISHER: Somy PUBLISHING CORPORATION
RELEASE DATE: 2012/05/21

☐ MY LIFE
AUTHOR: RYOKO NAKAMURA
PUBLISHER: NIHON MANGA CORPORATION
RELEASE DATE: 2012/05/21

APPLE AND MUSIC

INPUT CONTENT

[NEXT]

2. SELECT KEYWORDS (SELECT SETTINGS YOU MUST INCLUDE)

SETTINGS
☐ SPACE          ☐ PORTAL FANTASY   ☐ REINCARNATION IN ANOTHER WORLD   ☐ SCIENCE FICTION
☐ WAR            ☐ MODERN           ☐ HISTORY                          ☐ FUTURE
☐ SCHOOL         ☐ SUPERNATURAL     ☐ ANIMAL                           ☐ FAMILY
☐ ART            ☐ FRIENDSHIP       ☐ ROMANCE                          ☐ NURTURE

TONES
☐ SAD            ☐ SERIOUS          ☐ HEARTWARMING   ☐ COMICAL
☐ SWEET          ☐ DARK             ☐ PAINFUL        ☐ COMEDIC

TARGETS
AGES
☐ TEENS          ☐ 20S              ☐ 30S            ☐ 40S AND BEYOND

[NEXT]

FIG.10

1 SELECT CONTENT FOR REFERENCE

| INPUTTABLE CONTENT LIST | SELECT ALL | | INPUT CONTENT |
|---|---|---|---|
| ☑ STAYBLUE<br>AUTHOR: RYOKO NAKAMURA<br>PUBLISHER: Somy PUBLISHING CORPORATION<br>RELEASE DATE: 2020/02/25 | | | ☑ STAYBLUE<br>AUTHOR: RYOKO NAKAMURA<br>PUBLISHER: Somy PUBLISHING CORPORATION<br>RELEASE DATE: 2020/02/25 |
| ☐ WITH ROBOT THAT IS MY PET<br>AUTHOR: HIDEO SATO<br>PUBLISHER: Somy PUBLISHING CORPORATION<br>RELEASE DATE: 2012/05/21 | | | |
| ☐ MY LIFE<br>AUTHOR: RYOKO NAKAMURA<br>PUBLISHER: NIHON MANGA CORPORATION<br>RELEASE DATE: 2012/05/21 | | | |
| ☐ APPLE AND MUSIC | | | |

[NEXT]

2. SELECT KEYWORDS (SELECT SETTINGS YOU MUST INCLUDE)

SETTINGS
☐ SPACE      ☐ PORTAL FANTASY   ☐ REINCARNATION IN ANOTHER WORLD   ☐ SCIENCE FICTION
☐ WAR        ☐ MODERN           ☐ HISTORY                          ☐ FUTURE
☐ SCHOOL     ☐ SUPERNATURAL     ☐ ANIMAL                           ☐ FAMILY
☐ ART        ☐ FRIENDSHIP       ☐ ROMANCE                          ☐ NURTURE

TONES
☐ SAD        ☐ SERIOUS          ☑ HEARTWARMING   ☐ COMICAL
☐ SWEET      ☐ DARK             ☐ PAINFUL        ☐ COMEDIC

TARGETS
AGES
☐ TEENS      ☐ 20S              ☐ 30S            ☐ 40S AND BEYOND

[NEXT]

FIG.11

1. SELECT CONTENT FOR REFERENCE

🔍 RYOKO NAKAMURA

| INPUTTABLE CONTENT LIST | SELECT ALL |
|---|---|

☑ STAYBLUE
AUTHOR: [RYOKO NAKAMURA]
PUBLISHER: Somy PUBLISHING CORPORATION
RELEASE DATE: 2020/02/25

☐ WITH ROBOT THAT IS MY PET
AUTHOR: HIDEO SATO
PUBLISHER: Somy PUBLISHING CORPORATION
RELEASE DATE: 2012/05/21

☐ MY LIFE
AUTHOR: [RYOKO NAKAMURA]
PUBLISHER: NIHON MANGA CORPORATION
RELEASE DATE: 2012/05/21

APPLE AND MUSIC

INPUT CONTENT

☑ STAYBLUE
AUTHOR: RYOKO NAKAMURA
PUBLISHER: SOMY PUBLISHING CORPORATION
RELEASE DATE: 2020/02/25

[NEXT]

2. SELECT KEYWORDS (SELECT SETTINGS YOU MUST INCLUDE)

SETTINGS
☐ SPACE     ☑ PORTAL FANTASY  ☐ REINCARNATION IN ANOTHER WORLD  ☐ SCIENCE FICTION
☐ WAR       ☐ MODERN          ☐ HISTORY                         ☐ FUTURE
☐ SCHOOL    ☐ SUPERNATURAL    ☐ ANIMAL                          ☐ FAMILY
☐ ART       ☐ FRIENDSHIP      ☐ ROMANCE                         ☐ NURTURE

TONES
☐ SAD       ☐ SERIOUS         ☑ HEARTWARMING  ☐ COMICAL
☐ SWEET     ☐ DARK            ☐ PAINFUL       ☐ COMEDIC

TARGETS
AGES
☐ TEENS     ☑ 20S             ☐ 30S           ☐ 40S AND BEYOND

[NEXT]

FIG.12

1. SELECT CONTENT FOR REFERENCE

| SPECIFIABLE CONTENT LIST | SELECT ALL | | SPECIFIED CONTENT |
|---|---|---|---|
| ☑ | STAYBLUE<br>AUTHOR: RYOKO NAKAMURA<br>PUBLISHER: Somy PUBLISHING CORPORATION<br>RELEASE DATE: 2020/02/25 | ☑ | STAYBLUE<br>AUTHOR: RYOKO NAKAMURA<br>PUBLISHER: Somy PUBLISHING CORPORATION<br>RELEASE DATE: 2020/02/25 |
| ☑ | WITH ROBOT THAT IS MY PET<br>AUTHOR: HIDEO SATO<br>PUBLISHER: Somy PUBLISHING CORPORATION<br>RELEASE DATE: 2012/05/21 | ☑ | WITH ROBOT THAT IS MY PET<br>AUTHOR: HIDEO SATO<br>PUBLISHER: Somy PUBLISHING CORPORATION<br>RELEASE DATE: 2012/05/21 |
| ☐ | MY LIFE<br>AUTHOR: RYOKO NAKAMURA<br>PUBLISHER: NIHON MANGA CORPORATION<br>RELEASE DATE: 2012/05/21 | ☑ | APPLE AND MUSIC<br>AUTHOR: NAOTO MURA<br>PUBLISHER: NIHON MANGA CORPORATION<br>RELEASE DATE: 2012/05/21 |
| | APPLE AND MUSIC | | |

[NEXT]

2. SELECT KEYWORDS (SELECT SETTINGS YOU MUST INCLUDE)

SETTINGS
☐ SPACE          ☐ PORTAL FANTASY  ☐ REINCARNATION IN ANOTHER WORLD  ☐ SCIENCE FICTION
☐ WAR            ☐ MODERN          ☐ HISTORY                         ☐ FUTURE
☐ SCHOOL         ☐ SUPERNATURAL    ☐ ANIMAL                          ☐ FAMILY
☐ ART            ☐ FRIENDSHIP      ☐ ROMANCE                         ☐ NURTURE

TONES
☐ SAD     ☐ SERIOUS   ☐ HEARTWARMING  ☐ COMICAL
☐ SWEET   ☐ DARK      ☐ PAINFUL       ☐ COMEDIC

TARGETS
AGES
☐ TEENS   ☐ 20S   ☐ 30S   ☐ 40S AND BEYOND

[NEXT]

FIG.13

1. SELECT CONTENT FOR REFERENCE

INPUTTABLE CONTENT LIST — SELECT ALL

- ☑ STAYBLUE
  AUTHOR: RYOKO NAKAMURA
  PUBLISHER: Somy PUBLISHING CORPORATION
  RELEASE DATE: 2020/02/25
- ☑ WITH ROBOT THAT IS MY PET
  AUTHOR: HIDEO SATO
  PUBLISHER: Somy PUBLISHING CORPORATION
  RELEASE DATE: 2012/05/21
- ☐ MY LIFE
  AUTHOR: RYOKO NAKAMURA
  PUBLISHER: NIHON MANGA CORPORATION
  RELEASE DATE: 2012/05/21
- APPLE AND MUSIC

- ☑ STAYBLUE
  AUTHOR: RYOKO NAKAMURA
  PUBLISHER: Somy PUBLISHING CORPORATION
  RELEASE DATE: 2020/02/25
- ☑ WITH ROBOT THAT IS MY PET
  AUTHOR: HIDEO SATO
  PUBLISHER: Somy PUBLISHING CORPORATION
  RELEASE DATE: 2012/05/21
- ☑ APPLE AND MUSIC
  AUTHOR: NAOTO MURA
  PUBLISHER: NIHON MANGA CORPORATION
  RELEASE DATE: 2012/05/21

[NEXT]

2. SELECT KEYWORDS (SELECT SETTINGS YOU MUST INCLUDE)

SETTINGS
- ☐ SPACE   ☐ PORTAL FANTASY   ☐ REINCARNATION IN ANOTHER WORLD   ☑ SCIENCE FICTION
- ☐ WAR     ☑ MODERN           ☐ HISTORY                          ☐ FUTURE
- ☐ SCHOOL  ☐ SUPERNATURAL     ☑ ANIMAL                           ☐ FAMILY
- ☑ ART     ☑ FRIENDSHIP       ☐ ROMANCE                          ☐ NURTURE

TONES
- ☑ SAD     ☐ SERIOUS   ☑ HEARTWARMING   ☐ COMICAL
- ☐ SWEET   ☐ DARK      ☐ PAINFUL        ☐ COMEDIC

TARGETS AGES
- ☑ TEENS   ☑ 20S   ☐ 30S   ☐ 40S AND BEYOND

[NEXT]

FIG.16

- 311 SIMILAR CONTENT
- 312 SIMILAR POPULAR CONTENT
- 313 COMMON READERSHIP CONTENT
- 314 COMMON THEME CONTENT

EXISTING CONTENT | NEW CONTENT

315 / 316

ESCAPE ESCAPE

TOPIC DISTRIBUTION OF WORK
(bar chart: SCHOOL, FRIENDSHIP, DEEP IMPRESSION, SADISM, LOVE, MUSIC, DELINQUENT YOUTH, VIOLENCE)

| SETTINGS | TONES |
|---|---|
| [CLASSMATES] RESTART | SAD, COMICAL · SURREAL, PAINFUL |

(CHARACTER) TAICHI YAMADA

| OCCUPATION | AGE | APPEARANCE | PERSONALITY |
|---|---|---|---|
| STUDENT | TEENAGE | HANDSOME | SLIGHTLY SOCIALLY INEPT, OBSESSIVE, STRONG-WILLED |

(CHARACTER) NAOTO SATO

| OCCUPATION | AGE | APPEARANCE | PERSONALITY |
|---|---|---|---|
| STUDENT | TEENAGE | GLASSES | SOCIALLY ADEPT, PLAYBOY |

READ OUTLINE ▼

NAOTO REUNITES WITH HIS HIGH SCHOOL FRIEND TAICHI FOR THE FIRST TIME IN FIVE YEARS. NAOTO REGRETS HIS CHOICE WHEN HE SEES TAICHI STILL PURSUING THE SUCCESS OF HIS BAND IN CONTRAST TO HIMSELF WHO HAS GIVEN UP ON HIS DREAM OF BECOMING A MUSICIAN. ONE DAY, A MUTUAL FRIEND, HIDEO, ASKS TAICHI AND NAOTO IF THEY WANT TO BE IN A BAND TOGETHER AGAIN, AND NAOTO DECIDES TO FORM A BAND AGAIN. THIS IS A MUSICAL TEENAGE ENSEMBLE CAST!

YOUR INTEREST DISTRIBUTION
(bar chart)

KEYWORD SEARCH
🔍 INPUT KEYWORDS ✕
☑ PLAYBOY
☑ BLOND HAIR
☐ BAD YOUTH
☐ SOCIALLY ADEPT

INPUT KEYWORDS
☑ PLAYBOY
☑ BLOND HAIR
☑ 20S

[RE-INPUT CONTENT]

319 318 318

FIG.18
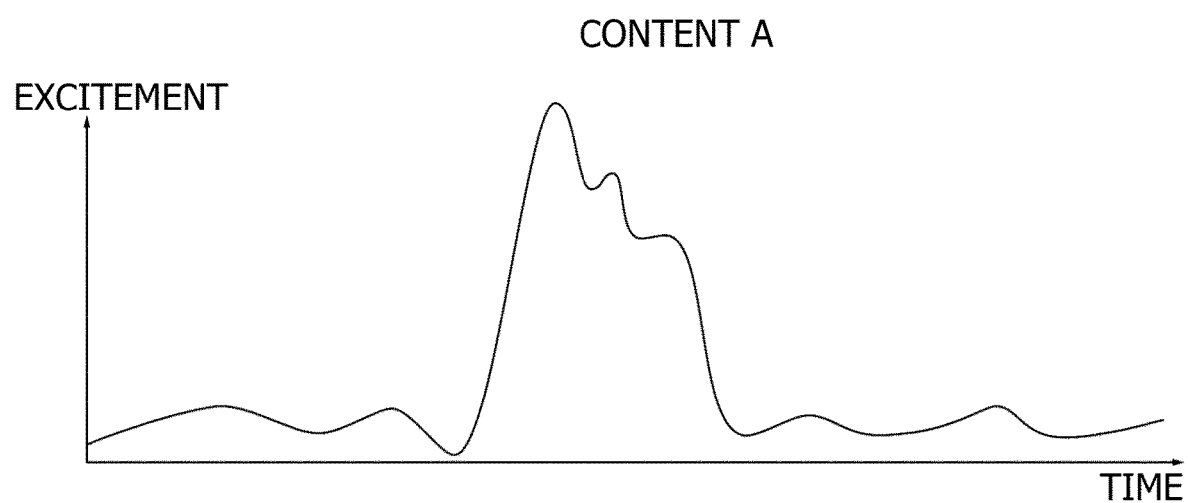
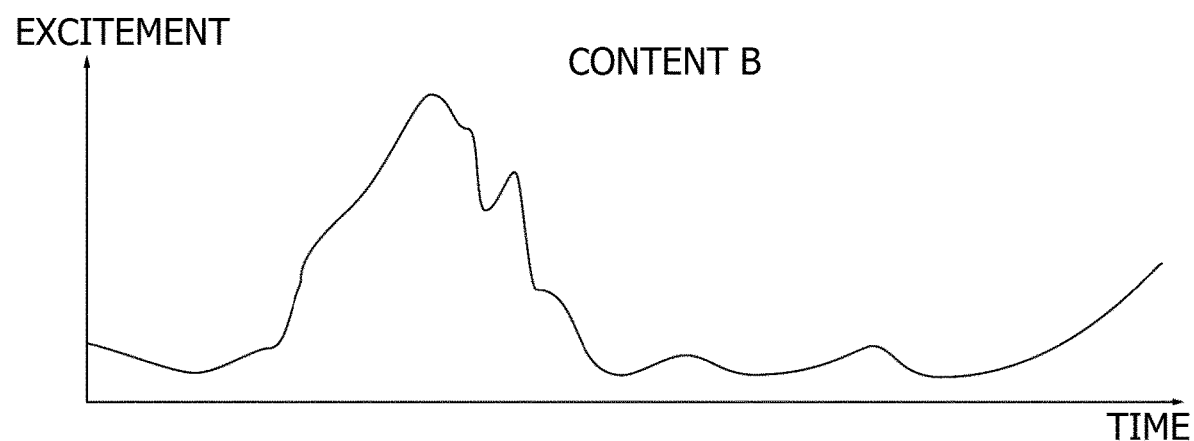

INFORMATION PROCESSING APPARATUS, INFORMATION PROCESSING METHOD, AND INFORMATION PROCESSING PROGRAM

CROSS-REFERENCE TO RELATED APPLICATIONS

The present application is based on PCT filing PCT/JP2021/029539, filed Aug. 10, 2021, which claims priority to Japanese Application No. 2020-189242, filed Nov. 13, 2020 and Japanese Application No. 2021-030091, filed Feb. 26, 2021, the entire contents of each are incorporated herein by reference.

TECHNICAL FIELD

The present technology relates to an information processing apparatus, an information processing method, and an information processing program.

BACKGROUND ART

Hitherto, a wide variety of content including news, movies, TV programs, music, novels, comics, and illustrations have been published on the Internet, and consumers have increasing opportunities to consume such content. In recent years, with the spread of global content delivery services, the demand for content has increased and the number of consumers who consume content has also increased, thereby making it important to create content based on the preferences of a diverse range of consumers.

Currently, however, it cannot be said that content creators are keeping up with such demand expansion and platform expansion. Further, a technology for efficiently creating content for a specific consumer group in cooperation with content creators has not been proposed. Regarding content creation, a technology for generating digests based on consumer preferences from freely-selected content has been proposed (PTL 1).

CITATION LIST

Patent Literature

[PTL 1]
Japanese Patent Laid-Open No. 2012-39550

SUMMARY

Technical Problem

However, the technology described in PTL 1 only generates digests of content and does not generate content based on various consumer preferences or assist content creators in generating content based on consumer preferences. In the current situation where it cannot be said that content creators are keeping up with demand expansion and platform expansion, there is a need for a technology for presenting information to content creators to allow the content creators to create content efficiently.

The present technology has been made in view of such a point and has an object to provide an information processing apparatus, an information processing method, and an information processing program that can present appropriate content that can be used as a reference for content creation to content creators.

Solution to Problem

In order to solve the problem described above, according to a first technology, there is provided an information processing apparatus including a content generating unit configured to generate new content on the basis of input information and status information indicating a status of a consumer when the consumer has consumed content, and to-be-presented content determining unit configured to determine any one of or both of the new content and existing content as to-be-presented content that is presented to a creator of the content.

Further, according to a second technology, there is provided an information processing method including generating new content on the basis of input information and status information indicating a status of a consumer when the consumer has consumed content, and determining any one of or both of the new content and existing content as to-be-presented content that is presented to a creator of the content.

Moreover, according to a third technology, there is provided an information processing program for causing a computer to execute an information processing method including generating new content on the basis of input information and status information indicating a status of a consumer when the consumer has consumed content, and determining any one of or both of the new content and existing content as to-be-presented content that is presented to a creator of the content.

BRIEF DESCRIPTION OF DRAWINGS

FIG. 3 is an explanatory diagram of consumer status information.

FIG. 6 illustrates explanatory diagrams of a first content generation method using a VAE and MF.

FIG. 7 illustrates explanatory diagrams of a second content generation method using a VAE and MF.

FIG. 9 is a diagram illustrating an exemplary input-use user interface.

FIG. 10 is a diagram illustrating an exemplary input-use user interface.

FIG. 11 is a diagram illustrating an exemplary input-use user interface.

FIG. 12 is a diagram illustrating an exemplary input-use user interface.

FIG. 13 is a diagram illustrating an exemplary input-use user interface.

FIG. 16 is a diagram illustrating an exemplary presentation-use user interface.

FIG. 18 illustrates graphs of a relation between the time of content and a consumer emotion.

DESCRIPTION OF EMBODIMENTS

Now, embodiments of the present technology are described with reference to the drawings. Note that the following items are described in order.

<1. First Embodiment>
[1-1. Configuration of Information Processing Apparatus 100]
[1-2. Processing by Information Processing Apparatus 100]
[1-3. Specific Example of User Interface]
<2. Second Embodiment>
[2-1. Configuration of Information Processing Apparatus 200]
[2-2. Content Generation Using Consumer Emotional Information]
<3. Modified Example>

1. Embodiment

[1-1. Configuration of Information Processing Apparatus 100]

Figure 1:
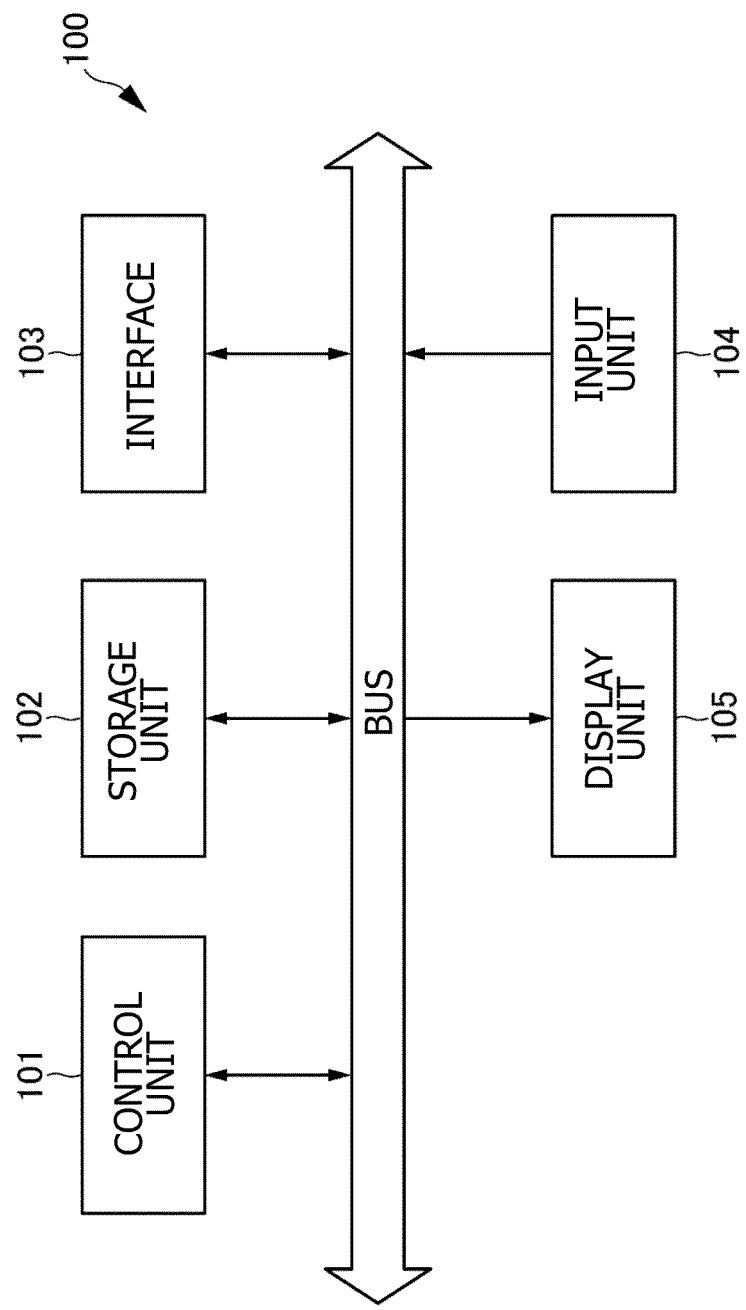
FIG. 1 is a block diagram illustrating the configuration of an information processing apparatus 100.

First, with reference to FIG. 1, the configuration of an information processing apparatus 100 is described. The information processing apparatus 100 includes a control unit 101, a storage unit 102, an interface 103, an input unit 104, and a display unit 105.

The control unit 101 includes a CPU (Central Processing Unit), a RAM (Random Access Memory), a ROM (Read Only Memory), and the like. The CPU executes various types of processing according to a program stored in the ROM to, issue commands and thereby controlling the entire information processing apparatus 100 and each unit of the information processing apparatus 100.

The storage unit 102 is, for example, a mass storage medium such as a hard disk or a flash memory.

The interface 103 is an interface with a status information acquiring apparatus 500, other apparatuses, the Internet, and the like. The interface 103 may include a wired or wireless communication interface. Further, more specifically, the wired or wireless communication interface may include cellular communication such as 3TTE, Wi-Fi, Bluetooth (registered trademark), NFC, Ethernet (registered trademark), SDI (Serial Digital Interface), HDMI (registered trademark), USB (Universal Serial Bus), 4G (fourth-generation mobile communication system), 5G (fifth-generation mobile communication system), or the like. Further, in a case where the information processing apparatus 100 is connected to another apparatus by means of hardware, the interface 103 may include a connection terminal between the apparatuses, a bus in the apparatus, or the like. Further, in a case where the information processing apparatus 100 is implemented as a plurality of apparatuses in a distributed manner, the interface 103 may include different types of interfaces for the respective apparatuses. For example, the interface 103 may include both a communication interface and an interface in the apparatus.

The input unit 104 is used to provide various kinds of instructions to the information processing apparatus 100. When a user makes an input to the input unit 104, a control signal corresponding to the input is generated and supplied to the control unit 101. Then, the control unit 101 performs various kinds of processing corresponding to the control signal. Examples of the input unit 104 include various kinds of buttons, touch panels, and touch screens integrally configured with displays including the display unit 105.

The display unit 105 displays content, a GUI (Graphical User Interface), and the like. Examples of the display unit 105 include LCDs (Liquid Crystal Displays) and organic EL panels.

The information processing apparatus 100 includes, for example, a personal computer, a smartphone, a tablet terminal, or a server apparatus.

Figure 2:
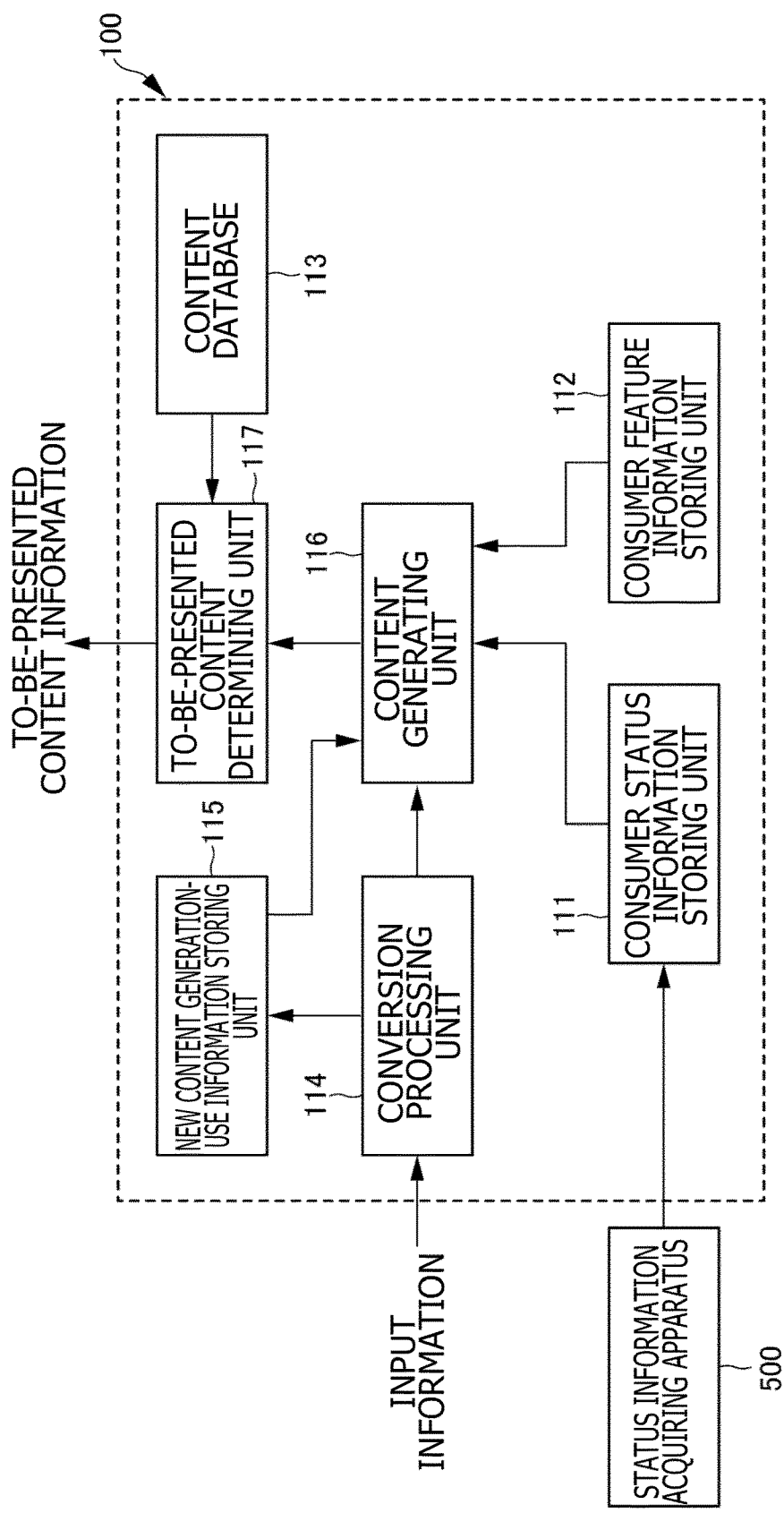
FIG. 2 is a block diagram illustrating processing blocks of the information processing apparatus 100 according to a first embodiment.

With reference to FIG. 2, the configurations of processing blocks of the information processing apparatus 100 are described. The information processing apparatus 100 includes a consumer status information storing unit 111, a consumer feature information storing unit 112, a content database 113, a conversion processing unit 114, a new content generation-use information storing unit 115, a content generating unit 116, and to-be-presented content determining unit 117.

The consumer status information storing unit 111, the consumer feature information storing unit 112, the content database 113, and the new content generation-use information storing unit 115 are functions implemented in the storage unit 102, and the control unit 101 instructs or controls each storage unit to store data or information. Further, the conversion processing unit 114, the content generating unit 116, and the to-be-presented content determining unit 117 are functions implemented by the control unit 101 performing processing.

Content is a product of human creative activity that belongs to the field of education or entertainment, examples of which include movies, TV programs, videos, music, sound, literature, photographs, comics, animations, illustrations, computer games, programs, and character strings.

Consuming content includes various use forms depending on various kinds of content, such as watching video content such as movies or TV programs, looking at image content such as illustrations or photographs, listening to sound content such as music, and reading text content. A consumer is a person who consumes such content.

A creator is a person who creates content, specific examples of which include movie directors, TV producers, filmmakers, musicians, writers, photographers, comic artists, animators, illustrators, game creators, and programmers. A creator may be an individual or an organization such as a production company, and the present technology is not limited to individuals or organizations.

In the present embodiment, content is provided to consumers by being delivered by content delivery services. Delivering is providing content by transmitting data over a network such as the Internet. Content may be provided by data downloading, streaming, or any other method that allows consumers to consume the content.

The consumer status information storing unit 111 stores consumer status information that is acquired by the status information acquiring apparatus 500 and indicates a consumer status with respect to consumed content, such as the action of a consumer with respect to a content delivery service or the action or reaction of a consumer during content consumption.

Examples of the action of a consumer with respect to a content delivery service include titles, types, and genres of consumed content, whether the detail pages of content have been browsed or not, and what has been registered in a favorites or watch list etc.

Examples of the action or reaction of a consumer during content consumption include completing watching content, stopping (or pausing) content being reproduced, inputting "Good" or "Like," fast forwarding content being reproduced, making a content change, smiling, averting his/her face, averting his/her eyes, closing his/her eyes, clapping his/her hands, hiding his/her face in his/her hands, saying a particular phrase ("it is interesting," "I like it," "I do not like it," "it is disgusting," or the like), shouting, and moving.

Consumer status information may include biological information such as the amount of sweating, body temperature, or heart rate of a consumer during content consumption.

Further, examples of information that is included in consumer status information include consumer evaluation information regarding evaluation of existing content that can be comprehensively acquired from the browsing history of content detail pages of a consumer, the content purchase history of the consumer, "Good" or "Like" input by the consumer, and the like.

Examples of the status information acquiring apparatus 500 include web browsers that consumers use to consume content and user interfaces provided by content delivery services (applications on browsers, applications configured to operate on personal computers, and the like). Further, the examples include devices that can acquire consumer status information as video, images, or sound, such as cameras, infrared cameras, infrared sensors, and microphones. Moreover, the examples include various kinds of biosensors such as sweating sensors, temperature sensors, and heart rate sensors.

The status information acquiring apparatus 500 may be included in the information processing apparatus 100 or a content reproducing apparatus, may be included in an apparatus different from those apparatuses, or may be configured as an independent apparatus. In a case where the status information acquiring apparatus 500 is configured as a separate apparatus from the information processing apparatus 100, the information processing apparatus 100 receives status information acquired by the status information acquiring apparatus 500 via a network and the interface 103.

Consumer status information includes, for example, as illustrated in FIG. 3, a user ID for identifying individual consumers of a consumer group, a content ID for identifying content consumed by a consumer, date and time indicating when those pieces of information have been acquired, and a consumer status with respect to content, which are associated with each other.

The consumer feature information storing unit 112 stores consumer feature information. Examples of consumer feature information include the age, gender, nationality, address, and content genre preference of a consumer. Consumer feature information can be acquired from, for example, what a consumer has input when registering for a content delivery service as a user.

Moreover, examples of consumer feature information include statistical information such as purchase or consumption frequency of content extracted from action logs of a consumer group including a plurality of consumers. A consumer group includes, for example, all registered users of a content delivery service or all consumers of the registered users who have purchased specific existing content.

The content database 113 stores existing content that is content distributed in the market and available to consumers via content delivery services. Note that the content database 113 is not necessarily included in the information processing apparatus 100 and may be constructed on an external server or the like. The information processing apparatus 100 may access the content database 113 to acquire existing content.

The conversion processing unit 114 is supplied with input information input to the information processing apparatus 100 by a creator. The conversion processing unit 114 performs the processing of converting input information into new content generation-use information. The details of conversion processing are described later.

Input information is information for new content generation that is input by a creator and includes input content, input keywords, or the like. New content generation-use information is information that the content generating unit 116 uses when generating content. Generated new content generation-use information is stored in the new content generation-use information storing unit 115.

Input content is content input by a creator as a condition or element for new content generation by the content generating unit 116. A creator can input, as input content, existing content distributed in the market and available to consumers, existing content created in the past by the creator or the production company, or the like. Input content is not necessarily a single piece of complete content and may be a portion of content that makes up the content (a part of the content). Examples of input content may include still images, videos, storyboards, CG (Computer Graphic) images, scenarios, attributes or appearances of characters expressed in images or text, melodies, lyrics, and sentences.

A creator can input input content by selecting content to be used as input content from existing content, which is stored in the content database 113, presented to the creator by the information processing apparatus 100. Further, a creator may input input content by inputting data on content to the information processing apparatus 100.

An input keyword is a keyword input by a creator as a condition or element for new content generation by the content generating unit 116. It can be said that an input keyword is a keyword representing the details or concept of new content.

A creator can input an input keyword by selecting a keyword to be used as an input keyword from a plurality of keywords, which is prepared in advance as a template, presented to the creator by the information processing apparatus 100. Further, a creator may input an input keyword by directly inputting a character string as a keyword.

Note that a creator may input one or a plurality of pieces of input information, and the number of pieces of input information is not limited. Further, a creator may input both input content and input keywords.

The content generating unit 116 generates new content on the basis of new content generation-use information generated from input information, consumer status information, consumer feature information, consumer evaluation information, and the like. The content generating unit 116 can generate one or a plurality of pieces of content. Further, the type of new content that the content generating unit 116 generates is not limited by the type of input content or input keywords, and any type of content that consumers can consume as content may be generated.

The to-be-presented content determining unit 117 determines any one of or both of new content generated by the content generating unit 116 and a plurality of pieces of existing content stored in the content database 113 as to-be-presented content that is to-be-presented content to a creator. To-be-presented content is presented to a creator as ideas, tips, or the like for content creation by the creator. Determined to-be-presented content is output as to-be-presented content information to be displayed on the display unit 105 or the like, thereby being presented to a creator.

The information processing apparatus 100 is configured as described above. The information processing apparatus 100 may be configured as a dedicated hardware apparatus that functions as the information processing apparatus 100. Further, the information processing apparatus 100 is not necessarily configured as a dedicated apparatus and may be configured by a program. Electric equipment may execute the program to function as the information processing apparatus 100. The program may be installed on electric equipment in advance, or the program may be distributed as a download program or through a storage medium, for example, and a consumer may install the program on his/her electric equipment by himself/herself.

In a case where a content delivery service provider creates content, the information processing apparatus 100 operates on the content delivery service provider's electric equipment. Further, in a case where a creator creates content and a content delivery service provider delivers the content, for example, the conversion processing unit 114, the new content generation-use information storing unit 115, the content generating unit 116, and the to-be-presented content determining unit 117 operate on the creator's electric equipment, and the consumer status information storing unit 111, the consumer feature information storing unit 112, and the content database 113 operate on the content delivery service provider's electric equipment.

[1-2. Processing by Information Processing Apparatus 100]

Figure 4:
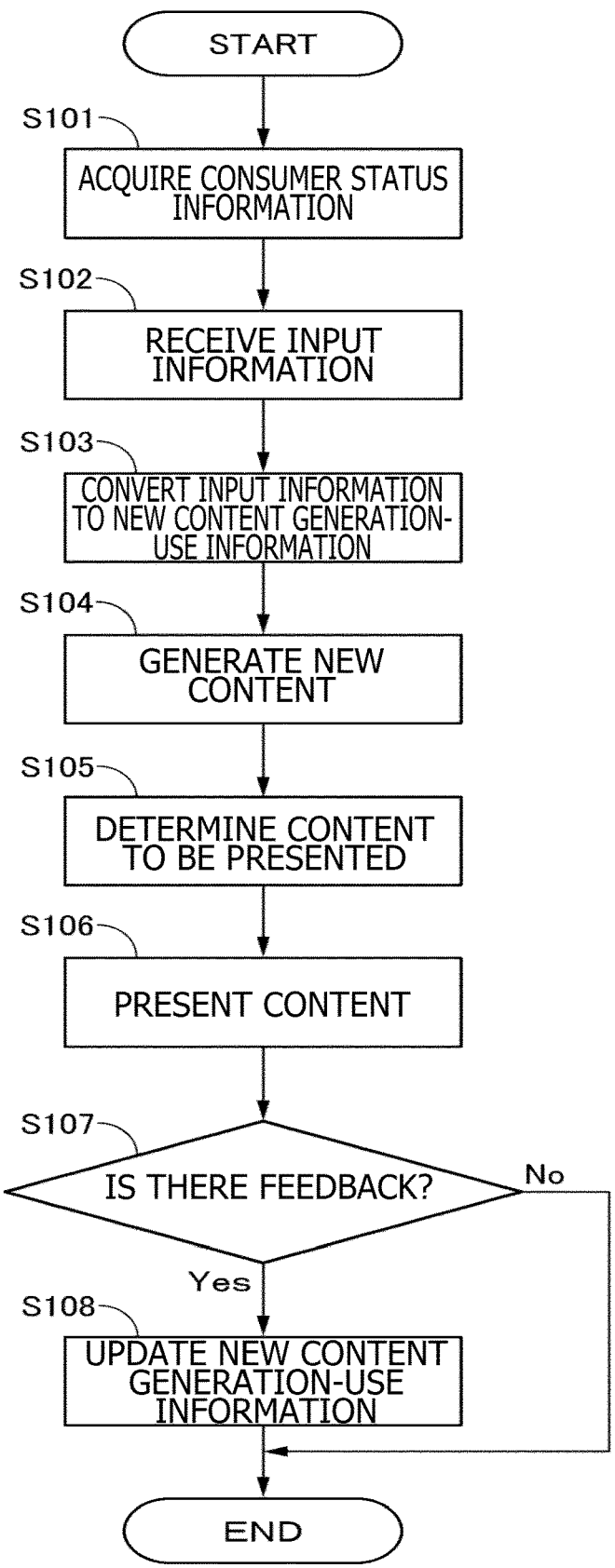
FIG. 4 is a flowchart illustrating processing by the information processing apparatus 100.

Next, processing by the information processing apparatus 100 is described with reference to the flowchart of FIG. 4. Note that it is assumed that consumer feature information is stored in the consumer feature information storing unit 112 in advance.

First, in Step S101, the information processing apparatus 100 acquires consumer status information from the status information acquiring apparatus 500 and stores the consumer status information in the consumer status information storing unit 111. Note that the information processing apparatus 100 accumulates consumer status information by always acquiring consumer status information from the status information acquiring apparatus 500 and storing the consumer status information in the consumer status information storing unit 111 irrespective of whether the information processing apparatus 100 is generating content or determining to-be-presented content.

Next, in Step S102, the information processing apparatus 100 receives input information input by a creator.

Next, in Step S103, the conversion processing unit 114 converts the input information into new content generation-use information by conversion processing. The conversion processing unit 114 performs conversion processing by extracting information from input information and modeling the information.

As the model, for example, a topic model, a neural network, or Factorization Machines can be used. For example, in a case where a topic model is used, with a single piece of content as input information being regarded as a single document and keywords or the like included in the input information being regarded as words, the input information is compressed to a topic vector by LDA (Latent Dirichlet Allocation) or the like. In a case where that kind of input information, which is text information, is processed by LDA, the input information is broken down by word or word group by preprocessing and then compressed to a topic vector. At this time, a Supervised topic model or the like may be used to extract a topic that contributes to consumer evaluation by utilizing feedback (an evaluation value or the like) from the consumer. In a case where input information is text information such as a scenario, settings, sentences, or keywords, the input information is vectorized by a neural network model such as LSTM (Long Short Term Memory) or Transformer. In a case where input information is an image, without information extraction, the input information is appropriately compressed by a VAE (Variational Auto Encoder), for example, to be converted into information that can be handled as a vector (or a tensor).

With regard to information extraction from input information, for example, information can be extracted from content serving as input information by a method that takes the average value of topic vectors of respective pieces of content vectorized by the various kinds of models described above, for example. Alternatively, with the use of a topic model as the model, the feature amount of input information and input keywords selected by a creator separately from the input content may be regarded as a single document and converted into a similar topic vector by using a learned model, and the topic vector may be used as new content generation-use information. Further, various kinds of input information input by a creator are not necessarily regarded as a single piece of information, and content or keywords serving as input information may be directly used as input information for selection or sorting of to-be-presented content in "selection of to-be-presented content" described later.

The conversion processing unit 114 sometimes vectorizes input information without other processing and extracts information from input information and vectorizes the extracted information at other times.

Figure 5:
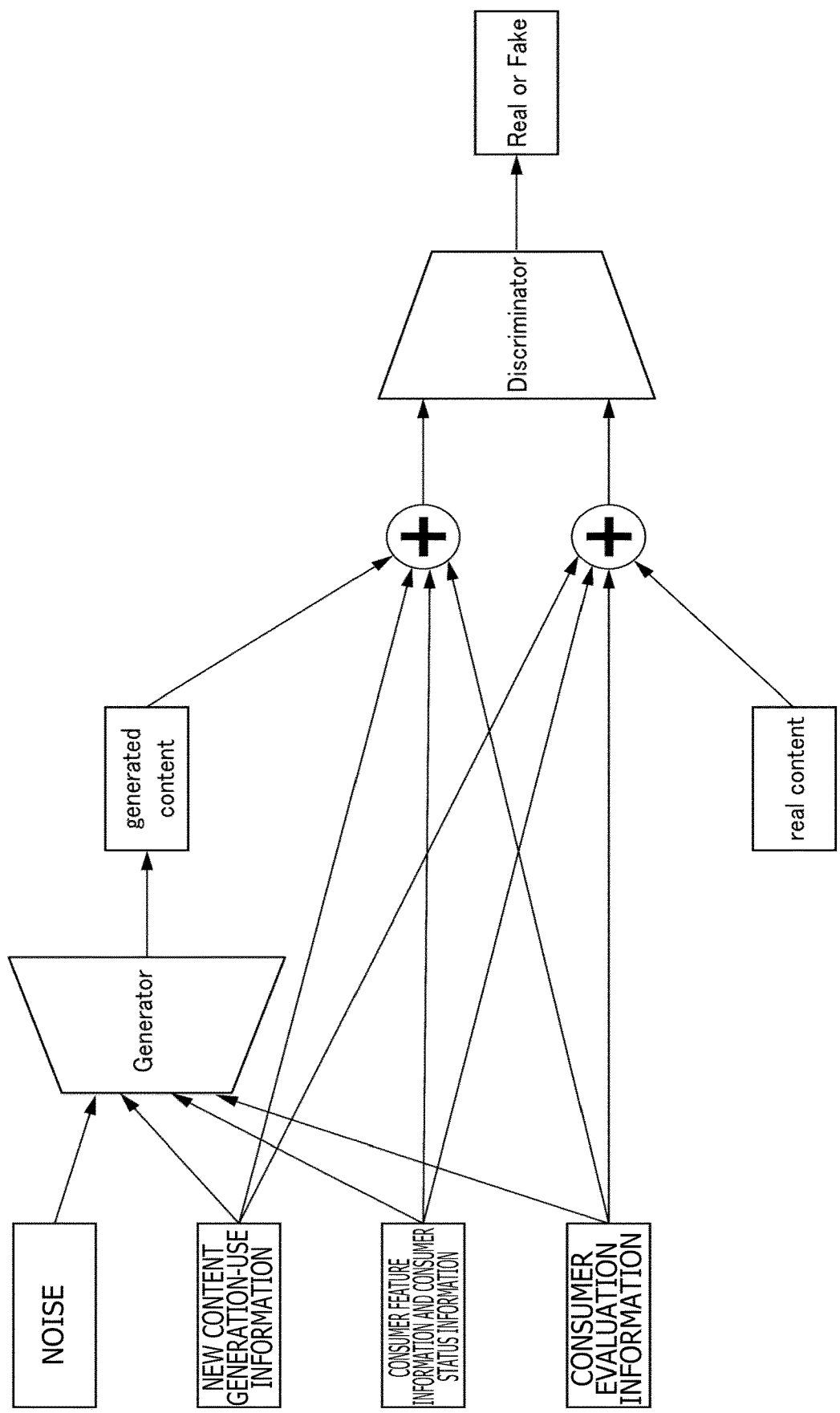
FIG. 5 is an explanatory diagram of content generation using a GAN.

Next, in Step S104, the content generating unit 116 generates new content. New content can be generated by using, for example, a Conditional GAN (Generative Adversarial Network) as illustrated in FIG. 5. A generator (Generator) in the Conditional GAN receives noise, new content generation-use information, consumer status information, consumer feature information, and consumer evaluation information included in consumer status information.

New content generation-use information is obtained by conversion by the conversion processing unit 114 and fixed.

Consumer feature information is consumer feature information regarding a consumer related to input information used to generate new content generation-use information (for example, a consumer who has purchased or evaluated the input content or a consumer who has searched for or purchased content by using the input keywords). The content generating unit 116 reads consumer feature information from the consumer feature information storing unit 112 to generate new content by using the consumer feature information.

Consumer evaluation information is, for example, information regarding evaluation of existing content by a consumer related to input information used to generate new content generation-use information (a consumer as described above). The content generating unit 116 reads consumer evaluation information from the consumer status information storing unit 111 to generate new content by using the consumer evaluation information.

A discriminator (Discriminator) in the Conditional GAN receives new content generation-use information, consumer status information, consumer feature information, consumer evaluation information included in consumer status information, content related to input information used to generate new content generation-use information, and content itself. The term "content itself" refers to content generated by the generator (generated content in FIG. 5) or any content of existing content (content that has not discharged from the generator but has existed) (real content in FIG. 5). The discriminator makes a classification between existing content and generated content on the basis of "content itself" and other information (new content generation-use information, consumer status information, consumer feature information, and consumer evaluation information included in consumer status information). Thus, existing content is randomly selected in principle.

New content generation-use information is obtained by conversion by the conversion processing unit 114 and fixed.

Content related to input information used to generate new content generation-use information is content directly included in information from which new content generation-use information is extracted, an input keyword, or the like.

Consumer feature information and consumer evaluation information are consumer feature information regarding a consumer who has evaluated content related to input information used to generate new content generation-use information and consumer evaluation information regarding the evaluation.

Note that a generator G does not necessarily need input and may generate content with, for example, a general GAN, and the content may be filtered or sorted in terms of various kinds of perspectives in the next step.

Further, new content can be generated by using a VAE (Variational Autoencoder) and MF (Matrix Factorization). A first new content generation technique using a VAE and MF is described with reference to FIG. 6.

New content generation using a VAE and MF is divided into a learning stage and a generation stage. FIG. 6A illustrates the learning stage of the first new content generation technique. On the learning stage, the processing is performed with a first encoder Em, a second encoder Eu, a feature space, a decoder Dm, and a predictor fr.

On the learning stage, the first encoder Em receives new content generation-use information. Moreover, the second encoder Eu receives consumer status information and consumer feature information. For the convenience of the description, consumer status information and consumer feature information are collectively referred to as "consumer information."

Then, the new content generation-use information and the consumer information are mapped on the feature space, and content is generated from feature points in the feature space through the decoder Dm. By applying MF to this, it is possible to create a feature space that reflects consumer evaluation.

Specifically, as illustrated in FIG. 6A, the new content generation-use information is vectorized by the first encoder Em (vectorized information is referred to as "content vector") and the consumer information is vectorized by the second encoder Eu (vectorized information is referred to as "consumer vector"). Moreover, by using the predictor f_r using MF, consumer evaluation of input content converted into the new content generation-use information is predicted. The predictor fr predicts consumer evaluation of input content converted into new content generation-use information, on the basis of a content vector obtained by vectorizing new content generation-use information and a consumer vector obtained by vectorizing consumer information.

The distance between a consumer vector and a content vector is input to the evaluator fr. It is learned that the higher consumer evaluation of input content serving as new content generation-use information, the shorter the distance between a consumer vector and a content vector on the feature space. With this, a consumer and input content highly evaluated by the consumer are mapped on the feature space with a short distance therebetween.

FIG. 6B illustrates the generation stage of new content generation using a VAE. On the generation stage, the processing is performed with the feature space formed on the learning stage and the decoder Dm. In generating new content, the decoder Dm generates new content from a point in the region in which a group of target consumers gather on the feature space, thereby being capable of generating new content that is likely to be highly evaluated by the targeted consumer segment.

Next, a second new content generation technique using a VAE and MF is described with reference to FIG. 7. With the first technique described above, new content based on optional conditions cannot be generated. Examples of optional conditions include the genres of new content and characters in new content. Thus, in the second technique, to make it possible to generate new content based on optional conditions, learning is performed in a VAE with a control-use dimension for identifying optional conditions provided on a feature space. Here, a description is given on the assumption that input content and new content are movie scripts and an optional condition is a movie genre.

FIG. 7A illustrates the learning stage of the second new content generation technique. On the learning stage, the processing is performed with a first encoder Em1, a second encoder Em2, a third encoder Eu, a feature space, a first decoder Dm1, a second decoder Dm2, and the predictor fr.

In the second technique, new content generation-use information includes control-use information. Control-use information is information for controlling generation of new content to generate new content that meets optional conditions. The conversion processing unit 114 converts information identifying a genre input by a creator as input information into control-use information and includes the control-use information in new content generation-use information.

To enable input of information identifying a genre, movie genres (for example, horror, comedy, mystery, and the like) are defined and classified in the information processing apparatus 100 in advance. A creator specifies any of the defined genres, thereby being capable of inputting information identifying a genre as input information. For example, in a case where 10 genres are defined in advance, of the 10-dimensional vector, a specified genre is given 1 and the remaining genres are given 0. Note that a creator may specify one or a plurality of genres.

Note that, on the learning stage, the genre of input content that is converted into new content generation-use information and information indicating conditions for input content that is converted into control-use information, that is, a genre in information identifying the genre of input content need to match each other.

On the learning stage, the first encoder Em1 receives, among new content generation-use information, information excluding control-use information. Further, the second encoder Em2 receives the control-use information, and only the control-use information is represented in a specific dimension on the feature space. In FIG. 7A and FIG. 7B, the vertical axis on the feature space corresponds to control information and the horizontal axis corresponds to new content generation-use information excluding control-use information. Moreover, the second encoder Eu receives consumer status information and consumer feature information. Consumer status information and consumer feature information are collectively referred to as "consumer information."

Then, the new content generation-use information and the consumer information are mapped on the feature space. Content is generated from feature points in the feature space through the first decoder Dm1, control-use information is generated from the second decoder Dm2, and learning is performed. By applying MF to this, it is possible to create a feature space that reflects consumer evaluation.

FIG. 7B illustrates processing on the generation stage of the second new content generation technique using a VAE. On the generation stage, processing is performed with the second encoder Em2, the feature space, and the first decoder Dm1.

As illustrated in FIG. 7B, on the generation stage, the first decoder Dm1 generates new content from a point in the region in which a group of target consumers gather on the feature space, with a control-use dimension fixed on the basis of the control-use information input to the second encoder Em2 in the feature space. With this, new content that is based on control-use information, that is, optional conditions, and is likely to be highly evaluated by a targeted consumer segment can be generated.

For example, a case where a creator wants to generate a script for a comedy movie as new content is considered. In this case, the genre "comedy" is an optional condition. On the learning stage, new content generation-use information obtained from input information including scripts for existing comedy movies is input to the first encoder Em1, control-use information obtained by converting information identifying the genre "comedy" is input to the second encoder Em2, and learning is performed. Then, on the generation stage, the control-use information obtained by converting the information identifying the genre "comedy" is input to the second encoder Em2, and the first decoder Dm1 generates, as new content, a script for a movie in the genre "comedy" from a feature point that is a point on an axis corresponding to the control-use information on the feature space, and is close to a group of target consumers. With this, new content that belongs to a genre intended by a creator, which is an optional condition, and is likely to be highly evaluated by a targeted consumer group can be generated.

Note that, in the above description of the second technique, the new content generation-use information and the control-use information are separately input to the different encoders. However, control-use information may be included in new content generation-use information to be input to a single encoder. For example, in a case where the genre of content is an optional condition, the conversion processing unit 114 converts information including information identifying an input genre in addition to input content or keywords into new content generation-use information.

Although the control-use information has the genre as the optional content condition in the above description, new content can be generated with other conditions. For example, information indicating actors appearing in movie content can be converted into control-use information to generate, as new content, movie content including the actors specified on the basis of the optional conditions. In such a way, optional conditions may be anything related to elements of content.

Description will be made with respect to the flowchart of FIG. 4 again. Next, in Step S105, the to-be-presented content determining unit 117 determines to-be-presented content that is to-be-presented content to the creator from the new content and existing content. Note that, in a case where input content input by a creator as input information has been delivered, existing content includes the input content. The to-be-presented content determining unit 117 performs one of or both of sorting and selection of new content and existing content to determine to-be-presented content. Sorting is the process of determining the order of presentation of to-be-presented content to a creator.

The to-be-presented content determining unit 117 sorts a plurality of pieces of new content and existing content on the basis of the degrees of overall similarity with input content or new content generation-use information and selects content from the plurality of pieces of content to determine to-be-presented content. In selecting content, a threshold is set in advance, and new content and existing content with the degrees of overall similarity with input content equal to or higher than the threshold are selected as to-be-presented content.

Further, the to-be-presented content determining unit 117 can also sort a plurality of pieces of new content and existing content on the basis of the degrees of partial similarity with input content or new content generation-use information and selects content from the plurality of pieces of content to determine to-be-presented content. In selecting content, a threshold is set in advance, and new content and existing content with the degrees of partial similarity with input content equal to or higher than the threshold are selected as to-be-presented content.

Moreover, the to-be-presented content determining unit 117 can also sort a plurality of pieces of new content and existing content on the basis of the audience ratings or purchase rates of the existing content and selects content from the plurality of pieces of content to determine to-be-presented content. In selecting content, a threshold is set in advance, and new content and existing content with audience ratings or purchase rates equal to or higher than the threshold are selected as to-be-presented content.

There are selection methods including a method based on the degree of similarity with input content and a method based on the degree of similarity with new content generation-use information. A creator may be allowed to select which method to use, or either method may be set by default in advance. Note that, in either method, one or a plurality of pieces of content may be input, and the number of pieces of input content is not limited.

Further, the to-be-presented content determining unit 117 can also select and determine the top N pieces of sorted new content and existing content as to-be-presented content. N may be a value set in advance or an optional value set by a creator.

Next, in Step S106, the to-be-presented content determined by the to-be-presented content determining unit 117 is displayed on the display unit 105 to be presented to the creator.

In presenting to-be-presented content to a creator, the to-be-presented content is presented in an order based on sorting by the to-be-presented content determining unit 117. Further, in presenting to-be-presented content, input content with a high degree of similarity with the to-be-presented content, the features of input content that has contributed to the degree of similarity of input content with a high degree of similarity with the to-be-presented content, or the like may be presented together. With this, a creator can understand a relation between to-be-presented content and input content and understand why such to-be-presented content is being presented in a certain order. How to present to-be-presented content on the display unit 105 is described later.

Next, in Step S107, in a case where the creator who has checked the to-be-presented content inputs feedback to the information processing apparatus 100, the processing proceeds to Step S108 (Yes in Step S107).

A creator checks presented to-be-presented content. In a case where the creator considers that further regeneration of new content or presentation of other content is necessary, the creator can make additions, deletions, or modifications to the input information as feedback.

Next, in Step S108, the new content generation-use information stored in the new content generation-use information storing unit 115 is updated. The conversion processing unit 114 converts input information input as feedback into new content generation-use information and stores the new content generation-use information in the new content generation-use information storing unit 115, to thereby make a new content generation-use information update. New content generation-use information is generated as in Step S103 described above.

Meanwhile, in a case where there is no feedback input from the creator, the processing ends (No in Step S107).

Figure 8:
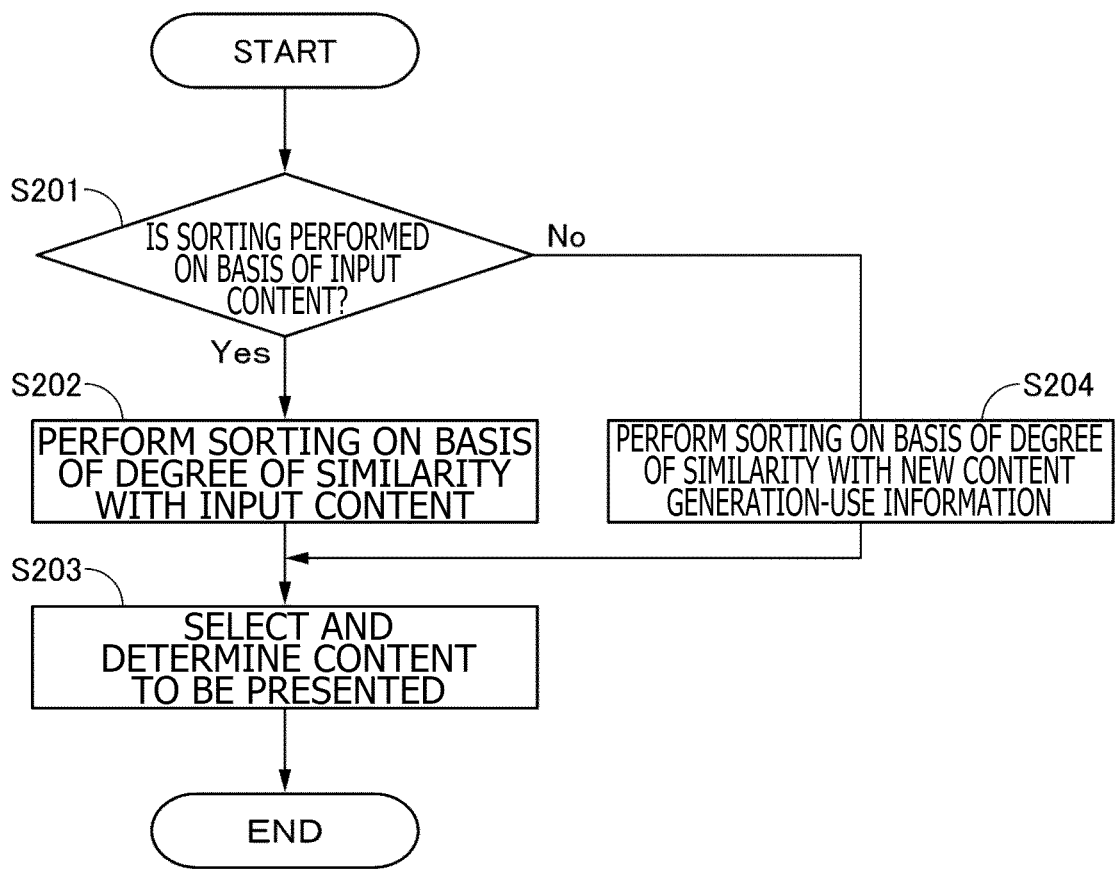
FIG. 8 is a flowchart illustrating the processing of determining to-be-presented content.

Next, the processing of determining to-be-presented content by the to-be-presented content determining unit 117 is described with reference to the flowchart of FIG. 8.

First, in Step S201, in a case where sorting is performed on the basis of the degree of similarity with input content, the processing proceeds to Step S202 (Yes in Step S201).

Next, in Step S202, the to-be-presented content determining unit 117 sorts new content and existing content on the basis of the degrees of similarity with the input content.

Then, in Step S203, the to-be-presented content determining unit 117 selects and determines to-be-presented content that is ultimately presented to a creator from the sorted new content and existing content. There are methods for selection as described above: selecting content by using a threshold and selecting the top N pieces of content in the sorting order.

With description being given with respect to Step S201 again, in a case where sorting is not performed on the basis of the degree of similarity with input content, the processing proceeds to Step S204 (No in Step S201). In this case, sorting is performed on the basis of the degree of similarity with new content generation-use information.

Next, in Step S204, the to-be-presented content determining unit 117 sorts new content and existing content on the basis of the degrees of similarity with the new content generation-use information.

Then, in Step S203, the to-be-presented content determining unit 117 selects and determines to-be-presented content that is ultimately presented to the creator from the sorted new content and existing content.

In a case where new content generation-use information includes vectors, the degree of similarity can be calculated by using functions that monotonically decrease with respect to the Euclidean distance between the respective vectors (for example, $\exp(-d)$ with respect to a Euclidean distance $d$) or using cosine similarity. Further, in calculating the degree of similarity, only an element(s) having a particularly high value (large absolute value) of the vectors of input content or new content generation-use information may be used. With this, to-be-presented content including, in addition to points important for a creator, elements that are not important for the creator and have not been incorporated by the creator can be presented to the creator, thereby allowing the creator to create new content by referring to the to-be-presented content.

Further, other than the method based on the degree of similarity, to-be-presented content can be determined on the basis of the criterion of whether a specific consumer group including a plurality of consumers purchases or highly evaluates content.

In such a case, with a specific consumer group taken as all consumers, to-be-presented content can be determined by sorting new content and existing content in descending order of predicted wide acceptance by all consumers, and by making selections. All consumers are, for example, all registered users in a specific content delivery service.

Meanwhile, with a specific consumer group taken as a consumer group only including consumers who have purchased input content, to-be-presented content can be determined by sorting new content and existing content in descending order of predicted future acceptance by the existing consumers, and by making selections.

Note that, since existing content has already been delivered, to-be-presented content can be determined from existing content by, for example, acquiring a whole consumer group or a group of consumers who have purchased input content, sorting the existing content on the basis of the sales volume or sales rate of the existing content in the consumer group, and making selections. Note that it is also possible to set a purchase rate threshold and determine existing content with a purchase rate equal to or higher than the threshold as to-be-presented content.

Further, to-be-presented content can be determined from new content by creating a predictor for a value of evaluation of each piece of new content by each consumer with, for example, Factorization Machines by using consumer status information, consumer feature information, content information (information regarding content that any consumer has consumed or evaluated, which is included in consumer status information), or the like, sorting the new content in descending order of predicted values or average value for a whole consumer group or a group of consumers who have purchased existing content, and making selections. With this, new content that is considered to be accepted (highly evaluated) by a whole consumer group or a group of consumers who have purchased existing content can be determined as to-be-presented content. Note that it is also possible to set a predicted value threshold and determine new content with a predicted value equal to or higher than the threshold as to-be-presented content.

Moreover, to-be-presented content can also be determined on the basis of how likely content is to be evaluated by consumers who have never consumed content created by a creator in the past.

In a case where input content is existing content created by a creator in the past, to-be-presented content is determined by sorting and selection based on the criterion of whether consumers who have not consumed content consume or evaluate the content. With this, a creator can know a group of works that expand the portfolio (also called lineup or catalog) for consumers who have never consumed content created by the creator. By referring to to-be-presented content determined in such a way, a creator can create content considered to be highly evaluated by consumers who have never consumed content created by the creator.

To-be-presented content can be determined from existing content by, for example, acquiring a group of consumers who have not purchased input content, sorting the existing content on the basis of the purchase rates in the consumer group, and making selections.

Note that, in the above description, a plurality of consumers who has consumed input content can be regarded as a consumer group only in a case where input content is existing content that has been completed and delivered.

In a case where only an input keyword is input as input information, to-be-presented content can also be determined with a group of consumers who have purchased existing content corresponding to (including) the input keyword or a group of consumers who have not purchased the existing content.

[1-3. Specific Example of User Interface]

Next, a user interface in a case where the processing by the information processing apparatus 100 is provided as an application or a web service is described with reference to FIG. 9 to FIG. 13. In the following description of the user interface, content is a comic. First, with reference to FIG. 9, an input-use user interface for input information for new content generation is described. The input-use user interface is displayed on the display unit 105 or the like.

The input-use user interface includes an inputtable content display section 301, an input content display section 302, a search-use input section 303, and a keyword input section 304.

The inputtable content display section 301 displays a plurality of pieces of existing content existing in the content database 113 to allow a creator to input existing content as input content. In the inputtable content display section 301, checkmark input fields for input of existing content as input content, which are associated with the respective pieces of existing content, are provided.

The input content display section 302 displays input content input by a creator. As illustrated in FIG. 10, when a check mark is placed on existing content to be input in the inputtable content display section 301, the existing content is displayed in the input content display section 302. A creator can visually check what existing content he/she has input as input content.

The search-use input section 303 allows input of any search-use keyword for searching a plurality of pieces of existing content displayed in the inputtable content display section 301 as illustrated in FIG. 11. FIG. 11 is an exemplary case where comics, which serve as content, are searched for by author name.

As illustrated in FIG. 12, in a case where a plurality of pieces of existing content has been input as input content, the plurality of pieces of input content is displayed in the input content display section 302.

The keyword input section 304 allows selection of input keywords that can be input together with input content. In the example of FIG. 13, a plurality of keyword candidates prepared in advance in the information processing apparatus 100 is displayed, and a creator selects a keyword that he/she wants to use as an input keyword from among the keyword candidates.

Note that, instead of selecting an input keyword from displayed candidates, a creator may directly input a character string as an input keyword.

Keyword candidates that are displayed in the keyword input section 304 may be the same all the time regardless of input content or changed depending on the type, genre, details, or the like of input content input by a creator. To achieve this, it is necessary to associate keyword candidates with respective pieces of existing content in advance in the information processing apparatus 100.

In the examples of FIG. 9 to FIG. 13, when selection of input content and input keywords is completed, input of input information for content generation is completed.

Figure 14:
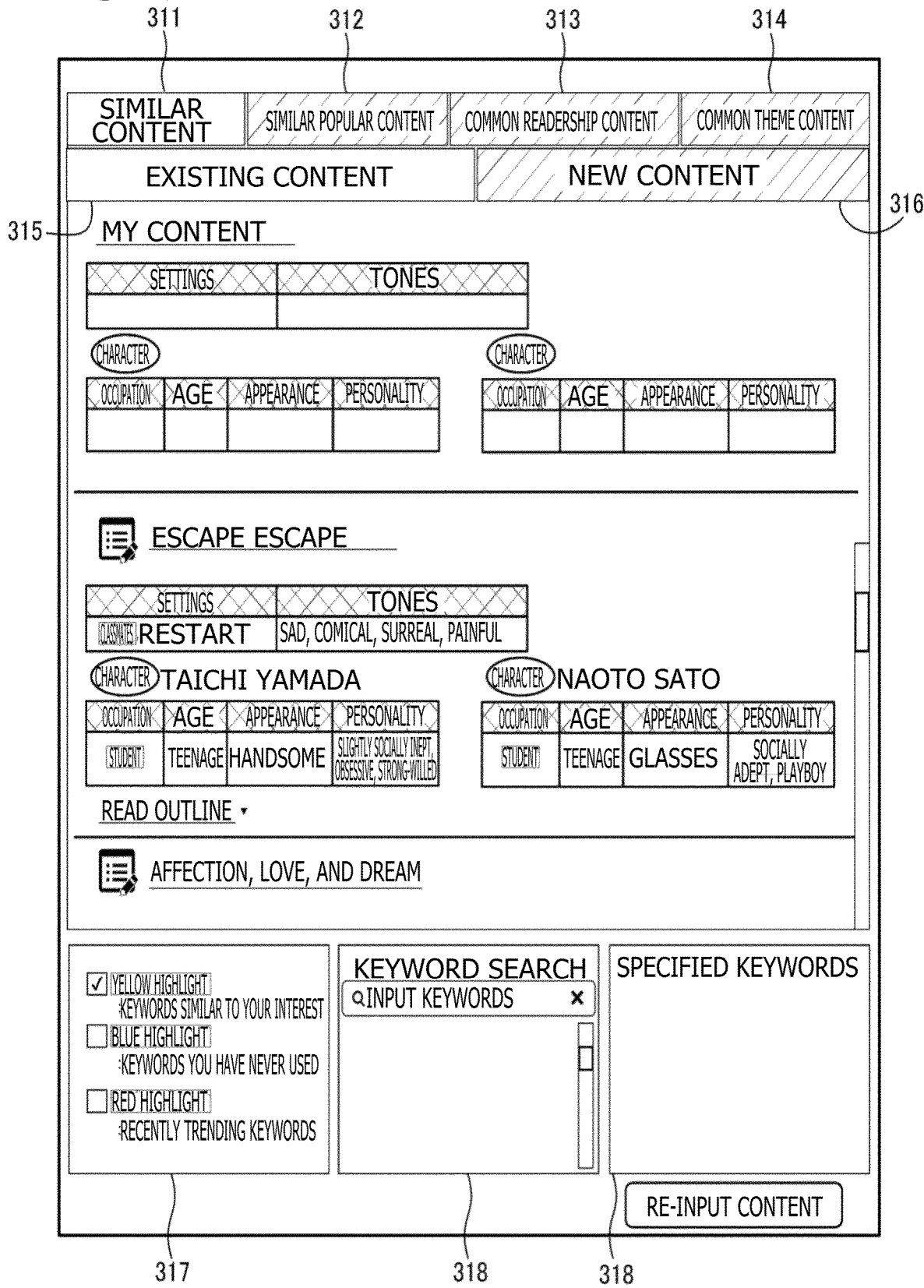
FIG. 14 is a diagram illustrating an exemplary presentation-use user interface.
Figure 15:
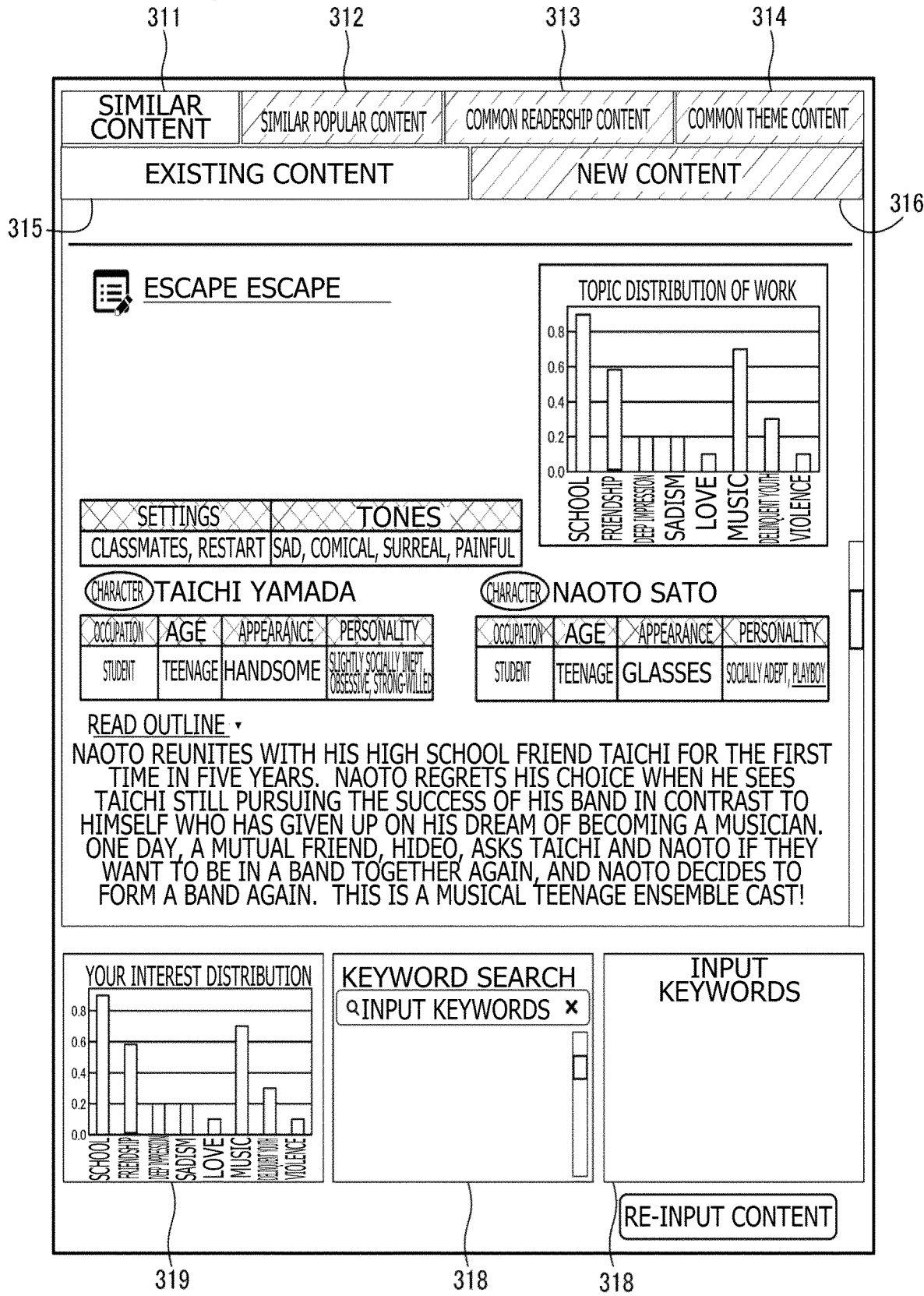
FIG. 15 is a diagram illustrating an exemplary presentation-use user interface.

Next, with reference to FIG. 14 to FIG. 16, a presentation-use user interface for presenting to-be-presented content to a creator is described. The presentation-use user interface is displayed on the display unit 105 or the like.

The presentation-use user interface includes a similar content presentation tab 311, a similar popular content presentation tab 312, a common readership content presentation tab 313, a common theme content presentation tab 314, an existing content 315, a new content tab 316, a highlight display input section 317, a keyword input section 318, and an interest distribution display section 319.

The similar content presentation tab 311 displays to-be-presented content determined from the degree of similarity with input content serving as input information or new content generation-use information. Further, the similar popular content presentation tab 312 displays popular content that is among the pieces of to-be-presented content determined from the degree of similarity with input content serving as input information or new content generation-use information. Popular content is, for example, content with a predetermined sales volume or higher in a content delivery platform or content ranked at a predetermined position or higher in a content delivery platform.

Further, the common readership content presentation tab 313 displays, among to-be-presented content, content with a readership common to that of input content serving as input information.

Moreover, the common theme content presentation tab 314 displays, that is among the pieces of to-be-presented content, content with a theme common to that of input content serving as input information as to-be-presented content. Common theme content is content extracted as a work with a work topic distribution in which an element having the largest value in the interest distribution of a creator, which is displayed in the interest distribution display section 319, also has the largest value.

Each tab described above includes, as substructures, the existing content 315 for displaying existing content and the new content tab 316 for displaying new content. With this, a creator can check existing content and new content displayed in the respective tabs separately in terms of to-be-presented content.

In each tab, information associated with to-be-presented content is displayed. Examples of information associated with to-be-presented content include information regarding the settings, tones, characters, and outlines of content. Note that those pieces of information to be displayed are merely exemplary, and the details of the present technology are not limited to the information illustrated in FIG. 14. Any information that is useful for a creator may be displayed.

The highlight display input section 317 displays information associated with displayed to-be-presented content in a highlighted manner on the basis of predetermined conditions. Examples of predetermined conditions include words that are close to the interests of a creator, words that the creator has never used, and recently trending words. The predetermined conditions are merely exemplary, and the details of the present technology are not limited to the information illustrated in FIG. 14.

The interest distribution display section 319 displays the interest distribution of a creator as a graph. The interest distribution of a creator is generated on the basis of new content generation-use information. For example, when new content generation-use information is a 10-dimensional vector corresponding to 10 sequential numerical values, a graph obtained by assigning element names to the respective dimensions serves as a graph depicting the interest distribution of a creator. Note that a creator may classify graphs, and element (dimension) names may be assigned manually by a person referring to analysis results or automatically from the analysis results.

A content re-input button is a button for making a transition to the input-use user interface to allow input of new input information.

The keyword input section 304 allows selection of keywords that can be input together with input content, like the section included in the input-use user interface. In the example of FIG. 16, the information processing apparatus 100 displays a plurality of keyword candidates in advance, and a creator selects a keyword that he/she wants to use as input information from among the keyword candidates.

The first embodiment of the present technology is configured as described above. According to the first embodiment, new content can be generated on the basis of input information input by a creator and consumer status information and consumer feature information that correspond to information associated with consumers, thereby being presented to the creator. The creator can create his/her new content by referring to the presented new content.

Further, since existing content can also be presented to a creator as to-be-presented content as well as new content, the creator can create his/her new content by referring to the presented existing content.

Since not only new content but also existing content is presented to a creator as to-be-presented content, a wide range of information for content creation can be provided to the creator.

A creator can create content by referring to to-be-presented content and sell or deliver the content, for example.

2. Second Embodiment

[2-1. Configuration of Information Processing Apparatus 200]

Next, a second embodiment of the present technology is described. The second embodiment generates new content by utilizing consumer emotions. The phrase "generating new content by utilizing consumer emotions" refers to generating new content that makes consumers get excited at the content in a specific pattern.

Figure 17:
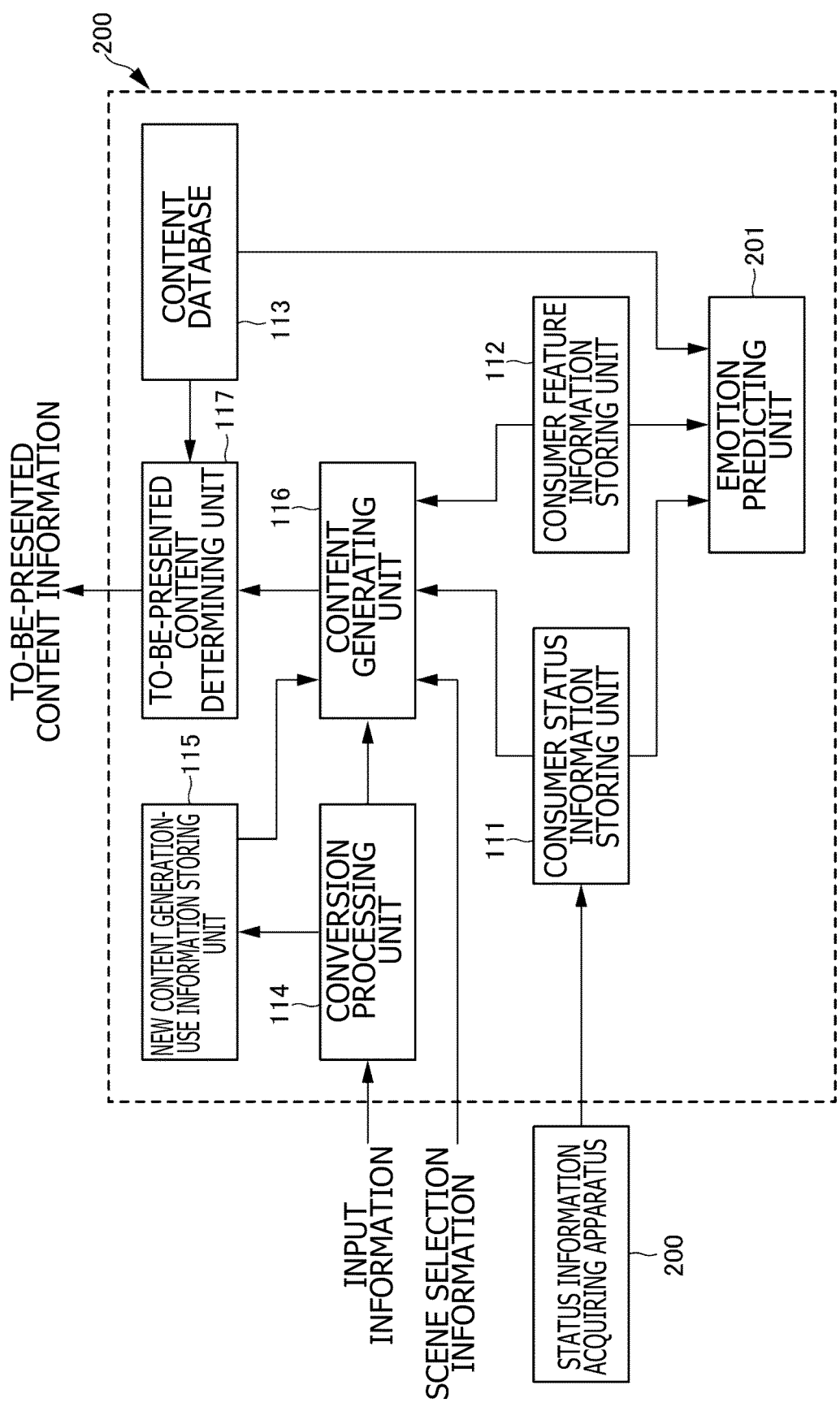
FIG. 17 is a block diagram illustrating processing blocks of an information processing apparatus 200 according to a second embodiment.

With reference to FIG. 17, the configurations of processing blocks of an information processing apparatus 200 according to the second embodiment are described. The information processing apparatus 200 is different from that of the first embodiment in including an emotion predicting unit 201. The remaining configurations are similar to those of the first embodiment, and hence, the description thereof is omitted.

The emotion predicting unit 201 predicts the emotional ups and downs of a consumer for a specific scene in content. The predicted emotional ups and downs value is presented to a creator together with a plurality of scene candidates, and the creator selects a scene to be included in content by referring to the predicted value.

[2-2. Processing in Information Processing Apparatus 200]

Next, processing in the information processing apparatus 200 is described. In this description, as an example, there is used video content, such as a movie, which progresses over time and in which a reproduction position in the content can be grasped from the elapsed time from the content reproduction start position.

The status information acquiring apparatus 500 acquires status information regarding a consumer during content consumption and stores the status information in the consumer status information storing unit 111 in association with a reproduction position in the content (the elapsed time from the start of content reproduction).

Consumer status information is not used as sensor information itself and is converted into emotional information indicating consumer emotions for content by mapping the consumer status information to one-dimensional numerical values, such as negativity and positivity or the degree of tension and the degree of excitement, by using separate various kinds of discriminators in the emotion predicting unit 201.

Separate various kinds of discriminators convert consumer status information, such as the action or reaction of a consumer when he/she is watching content, into numerical values indicating emotions for the content. For example, the action of "looking away" is considered as a negative reaction, and the number of times or duration of looking away during content consumption is quantified as a negative value. Further, the reaction of "smiling" is considered as a positive reaction, and the number of times or duration of smiling during content consumption is quantified as a positive value. Further, sweating is considered as a negative reaction, and the amount of sweating or the like during content consumption is quantified as a negative value. In such a way, all consumer actions and reactions serving as consumer status information are converted into numerical values representing consumer emotions.

Note that a consumer may be requested to input information indicating the degree of emotion (five-grade evaluation or the like) while watching content, and the emotion predicting unit 201 may associate consumer status information with the information indicating the degree of emotion, which has been input by the consumer, to convert the consumer status information into emotional information.

For example, by acquiring consumer status information for specific content and converting the consumer status information into emotional information, consumer excitement for reproduction positions on the time axis of the content can be expressed as illustrated in FIG. 18. In this case, consumer emotional information (excitement) may be emotional information regarding a single consumer or emotional information regarding a consumer group including a plurality of consumers. In a case where emotional information regards a consumer group, the average excitement of the plurality of consumers is used.

The emotion predicting unit 201 can create, by using a general supervised machine learning model g (hereinafter referred to as the "model g"), a prediction model represented by Equation 1 described below, where ft denotes a content feature amount at a time ft (for example, image information, characters, or music in a certain scene of a movie), fu denotes consumer status information and consumer feature information regarding a consumer u (for example, gender, age, or watched works), and yt denotes consumer emotional information (degree of excitement) at the time t of the content. With the model g, the degree of excitement yt in a scene of content can be predicted and calculated as a numerical value. Note that the consumer feature information fu and the degree of excitement yt correspond to the average value of the degrees of excitement of all target consumers.

$$Yt = g(ft, fu) \qquad \text{[Math. 1]}$$

Here, the model g may also use past time content feature amounts f(t−1), f(t−2), and so on as input. Further, the excitement of each consumer may not be used, and the average value of a plurality of consumers who has consumed content may be used, for example.

By using the model g, a creator can compare and consider a plurality of scene candidates when determining what kind of scene to follow a specific scene in a movie, for example. Each of a plurality of scene candidates is converted into a content feature value (ft), and the most suitable scene to achieve an excitement pattern intended by the creative team is selected.

Moreover, a final predicted excitement value (for example, the average predicted evaluation value for all consumers) in a case where a scene is selected may be presented to a creator in combination with user evaluation prediction.

The information processing apparatus 200 presents scene candidates and predicted excitement values to a creator in association with each other through a content generation-use user interface, which is described later. Then, the creator selects a scene candidate to adopt by referring to the predicted excitement values and makes a selection input. The scene selection information is supplied to the content generating unit 116, and the content generating unit 116 generates content on the basis of the scene selection information.

Figure 19:
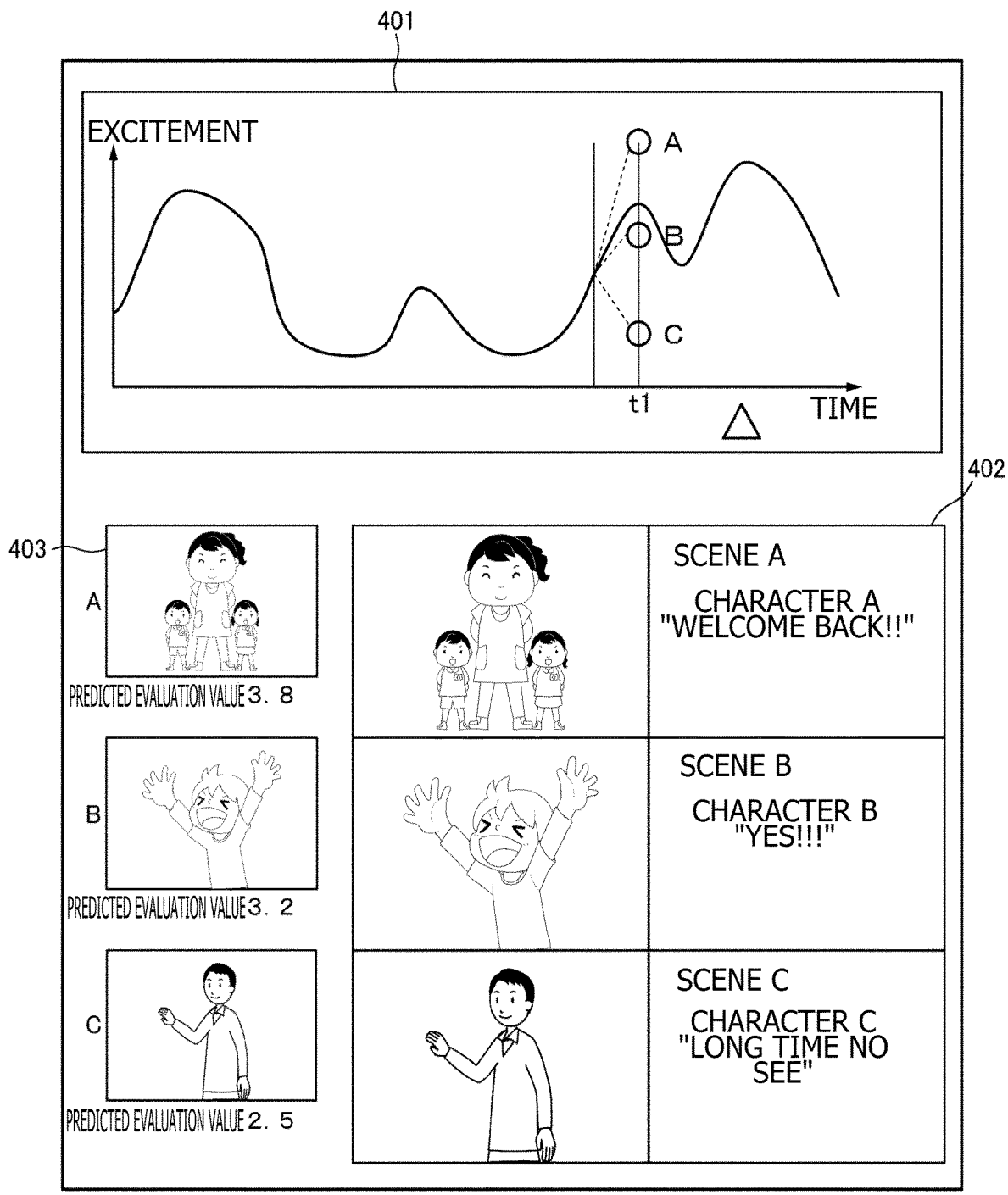
FIG. 19 is a diagram illustrating an exemplary content generation-use user interface using consumer emotional information.

FIG. 19 illustrates the content generation-use user interface by using consumer emotional information and content generation. The content generation-use user interface includes a graph display section 401, a scene candidate display section 402, and a predicted value display section 403.

The graph display section 401 displays a graph with the horizontal axis indicating the time (reproduction position) of video content and the vertical axis indicating information regarding a consumer emotion (excitement) for the video content. The scene candidate display section 402 displays specific video content of scene candidates. The predicted value display section 403 displays predicted excitement values for the respective scene candidates.

In the graph display section 401, consumer excitement intended by a creator is indicated by the solid line. Then, it is indicated that there are a scene candidate A, a scene candidate B, and a scene candidate C as scene candidates at the point of time at a time t1. The scene candidates A to C are each displayed in the scene candidate display section 402. Note that, scene candidates that are displayed in the scene candidate display section 402 may be in any form that allows a creator to grasp scene content, and may be still images, storyboards, illustrations, or videos.

The graph display section 401 displays predicted excitement values (predicted emotional ups and downs values) for the respective scene candidates predicted by the emotion predicting unit 201 on the graph by using the broken lines and dots. The creator can determine which scene candidate to adopt by looking at the predicted values. In the case of FIG. 19, when the scene candidate B is selected, video content that is closest to the intention of the creator can be generated. Further, the creator can check specific predicted values for the respective scene candidates on the predicted value display section 403.

Note that a creator may be allowed to edit an image or video representing a scene, which is displayed in the scene candidate display section 402, and excitement for the edited scene may be dynamically predicted.

For example, in a case where the creator selects the scene candidate B by referring to the predicted excitement values for the respective scene candidates displayed in the graph display section 401, the scene selection information is supplied to the content generating unit 116, and the content generating unit 116 generates new content including the scene candidate B.

The second embodiment of the present technology is configured as described above. According to the second embodiment, new content can be generated on the basis of consumer emotions or excitement, and the intention of a creator can be more reflected in the new content.

Note that, in the second embodiment described above, the video content, such as a movie, that progresses over time is taken as an example. However, content is not limited to video content and may be music, comics, or any other content that progresses.

Further, emotional information is not limited to indicating excitement. Emotional information may indicate joy, fun, anger, sadness, or any other emotion that can be obtained by conversion of consumer status information.

3. Modified Example

Although the embodiments of the present technology have been specifically described above, the present technology is not limited to the embodiments described above, and various kinds of modifications based on the technical ideas of the present technology are possible.

The present technology can also employ the following configurations.

(1)
An information processing apparatus including:
 a content generating unit configured to generate new content on the basis of input information and status information indicating a status of a consumer when the consumer has consumed content; and
 to-be-presented content determining unit configured to determine any one of or both of the new content and existing content as to-be-presented content that is presented to a creator of the content.

(2)
The information processing apparatus according to (1), in which the input information includes input content input by the creator.

(3)
The information processing apparatus according to (1) or (2), in which the content generating unit generates the new content on the basis of feature information regarding the consumer.

(4)
The information processing apparatus according to any one of (1) or (3), further including:
 a conversion processing unit configured to convert the input information into new content generation-use information, in which
 the content generating unit generates the new content on the basis of the new content generation-use information.

(5)
The information processing apparatus according to any one of (1) to (4), in which the content generating unit generates the new content on the basis of information regarding evaluation of the existing content by the consumer.

(6)
The information processing apparatus according to any one of (2) to (4), in which the content generating unit generates the new content on the basis of control-use information.

(7)

The information processing apparatus according to (6), in which the control-use information includes information indicating a condition of the input content and the new content.

(8)

The information processing apparatus according to (4), in which
the content generating unit performs processing on a learning stage and a generation stage,
the content generating unit predicts and learns, on the learning stage, evaluation of the input content by the consumer on the basis of the new content generation-use information, the status information, and control-use information, and
the content generating unit generates, on the generation stage, the new content on the basis of the control-use information.

(9)

The information processing apparatus according to any one of (1) to (8), in which the to-be-presented content determining unit determines any one of or both of the new content and the existing content as the to-be-presented content, on the basis of a degree of similarity with the input information.

(10)

The information processing apparatus according to (9), in which the to-be-presented content determining unit sorts the new content and the existing content in descending order of the degree of similarity with the input information to determine the to-be-presented content.

(11)

The information processing apparatus according to (9) or (10), in which the to-be-presented content determining unit determines the new content and the existing content with degrees of similarity with the input content equal to or higher than a predetermined threshold as the to-be-presented content.

(12)

The information processing apparatus according to any one of (1) to (11), in which the to-be-presented content determining unit determines the to-be-presented content from the new content and the existing content on the basis of a degree of similarity with the content generation-use information.

(13)

The information processing apparatus according to any one of (1) to (12), in which the conversion processing unit converts the input information serving as feedback to the to-be-presented content from the creator of the content into new content generation-use information.

(14)

The information processing apparatus according to any one of (1) to (13), in which, when the to-be-presented content is presented to the creator, the input content with a high degree of similarity with the to-be-presented content is also presented.

(15)

The information processing apparatus according to any one of (1) to (14), in which, when the to-be-presented content is presented to the creator of the content, an element of the input content that has contributed to the degree of similarity is also presented.

(16)

The information processing apparatus according to any one of (1) to (15), in which the to-be-presented content determining unit determines any one of or both of the new content and the existing content as the to-be-presented content, on the basis of a prediction on whether the consumer consumes or evaluates the new content or the existing content.

(17)

The information processing apparatus according to any one of (1) to (16), in which the input information includes a keyword indicating a detail of the new content.

(18)

The information processing apparatus according to any one of (1) to (17), in which the content generating unit generates the new content by using a scene candidate selected by the creator from a plurality of the scene candidates presented to the creator.

(19)

An information processing method including:
generating new content on the basis of input information and status information indicating a status of a consumer when the consumer has consumed content; and
determining any one of or both of the new content and existing content as to-be-presented content that is presented to a creator of the content.

(20)

An information processing program for causing a computer to execute:
an information processing method, the method including
generating new content on the basis of input information and status information indicating a status of a consumer when the consumer has consumed content, and
determining any one of or both of the new content and existing content as to-be-presented content that is presented to a creator of the content.

(21)

The information processing apparatus according to (18), in which the plurality of scene candidates is each presented together with a predicted value of emotional ups and downs of the consumer corresponding to a corresponding one of the scene candidates.

(22)

The information processing apparatus according to (18), in which the plurality of scene candidates is presented together with emotional ups and downs of the consumer intended by the creator.

REFERENCE SIGNS LIST

100: Information processing apparatus
114: Conversion processing unit
116: Content generating unit
117: To-be-presented content determining unit

The invention claimed is:

1. An information processing apparatus comprising:
control circuitry configured to:
    determine when a consumer has consumed existing content,
    generate new content on a basis of input information and status information indicating a status of a consumer at a time when the consumer has consumed the existing content; and
    determine any one of or both of the new content and the existing content as to-be-presented content that is presented to a creator of the new content,
    wherein the input information includes content that is input by the creator,
wherein the control circuitry is further configured to generate the new content on a basis of consumer feature information, information regarding an evaluation of the existing content by the consumer, and control-use information that includes information indicating a condition of the input content and the new content, wherein the control circuitry is further configured to:
convert the input information into new content generation-use information, and
generate the new content on a basis of the new content generation-use information, wherein the control circuitry is further configured to determine any one of or both of the new content and the existing content as the to-be-presented content based on both a first criteria and a second criteria, wherein the first criteria is based on a first degree of similarity between the to-be-presented content and the input information that is determined by:
sorting the new content and the existing content in descending order of the first degree of similarity with the input information to determine the to-be-presented content, and
determining the new content and the existing content with degrees of similarity with the input content equal to or higher than a predetermined content purchase rate threshold as the to-be-presented content, wherein the second criteria is based on a second degree of similarity between the to-be-presented content and the content generation-use information, and on a basis of a prediction on whether the consumer consumes or evaluates the new content or the existing content.

2. The information processing apparatus according to claim 1, wherein the control circuitry is further configured to:
perform processing on a learning stage and a generation stage,
predict and learn, on the learning stage, evaluation of the input content by the consumer on a basis of the new content generation-use information, the status information, and control-use information, and
generate, on the generation stage, the new content on a basis of the control-use information.

3. The information processing apparatus according to claim 1, wherein the control circuitry converts the input information serving as feedback to the to-be-presented content from the creator of the content into new content generation-use information.

4. The information processing apparatus according to claim 1, wherein, when the to-be-presented content is presented to the creator, the input content with a highest first degree of similarity with the to-be-presented content is also presented.

5. The information processing apparatus according to claim 1, wherein, when the to-be-presented content is presented to the creator of the content, an element of the input content that has contributed to the first degree of similarity is also presented.

6. The information processing apparatus according to claim 1, wherein the input information includes a keyword indicating a detail of the new content.

7. The information processing apparatus according to claim 1, wherein the control circuitry generates the new content by using a scene candidate selected by the creator from a plurality of the scene candidates presented to the creator.

8. An information processing method comprising:
determining when a consumer has consumed existing content;
generating new content on a basis of input information and status information indicating a status of a consumer at a time when the consumer has consumed the existing content; and
determining any one of or both of the new content and the existing content as to-be-presented content that is presented to a creator of the new content,
wherein the input information includes content that is input by the creator,
wherein the method further comprises generating the new content on a basis of consumer feature information, information regarding an evaluation of the existing content by the consumer, and control-use information that includes information indicating a condition of the input content and the new content,
wherein the method further comprises:
converting the input information into new content generation-use information, and
generating the new content on a basis of the new content generation-use information,
wherein the method further comprises determining any one of or both of the new content and the existing content as the to-be-presented content based on both a first criteria and a second criteria,
wherein the first criteria is based on a first degree of similarity between the to-be-presented content and the input information that is determined by:
sorting the new content and the existing content in descending order of the first degree of similarity with the input information to determine the to-be-presented content, and
determining the new content and the existing content with degrees of similarity with the input content equal to or higher than a predetermined content purchase rate threshold as the to-be-presented content,
wherein the second criteria is based on a second degree of similarity between the to-be-presented content and the content generation-use information, and on a basis of a prediction on whether the consumer consumes or evaluates the new content or the existing content.

9. A non-transitory computer product containing instructions for causing a computer to execute the method of claim 8.

* * * * *